United States Patent
Singh et al.

(10) Patent No.: US 12,319,006 B2
(45) Date of Patent: Jun. 3, 2025

(54) CONTROL SYSTEMS FOR ADDITIVE MANUFACTURING AND ASSOCIATED METHODS

(71) Applicant: Align Technology, Inc., San Jose, CA (US)

(72) Inventors: Paramjot Singh, San Jose, CA (US); Joanne L. Lee, San Jose, CA (US); Viswanath Meenakshisundaram, Santa Clara, CA (US)

(73) Assignee: Align Technology, Inc., San Jose, CA (US)

( * ) Notice: Subject to any disclaimer, the term of this patent is extended or adjusted under 35 U.S.C. 154(b) by 154 days.

(21) Appl. No.: 18/173,585

(22) Filed: Feb. 23, 2023

(65) Prior Publication Data
US 2023/0264427 A1  Aug. 24, 2023

Related U.S. Application Data
(60) Provisional application No. 63/268,425, filed on Feb. 23, 2022.

(51) Int. Cl.
*B29C 64/393* (2017.01)
*B29C 64/124* (2017.01)
(Continued)

(52) U.S. Cl.
CPC .......... *B29C 64/393* (2017.08); *B29C 64/124* (2017.08); *B29C 64/268* (2017.08);
(Continued)

(58) Field of Classification Search
CPC ..... B29C 64/393; B29C 64/124; B29C 64/35; B29C 64/268; B33Y 10/00; B33Y 50/00; B33Y 80/00; B33Y 40/20
See application file for complete search history.

(56) References Cited

U.S. PATENT DOCUMENTS
6,210,162 B1  4/2001  Chishti et al.
6,236,020 B1  5/2001  Friedman
(Continued)

FOREIGN PATENT DOCUMENTS
WO  WO 2018/217903  * 11/2018

OTHER PUBLICATIONS
"3D Printing Enhanced by Vision Controlled Jetting," https://inkbit3d.com (accessed Jan. 18, 2022).
(Continued)

*Primary Examiner* — Mathieu D Vargot
(74) *Attorney, Agent, or Firm* — FORTEM IP LLP

(57) ABSTRACT

Systems and methods for manufacturing objects are provided herein. In some embodiments, a method for producing an additively manufactured object includes applying energy to a curable material according to a set of print parameters to form a cured material layer on a build platform or on an object on the build platform. The method can also include conveying remaining material away from the build platform. The method can further include detecting, via one or more sensors, that the remaining material includes a portion of the cured material layer that has separated from the build platform or from the object. The method can subsequently include determining an adjusted set of print parameters configured to improve adhesion of cured material to the build platform or to the object.

20 Claims, 13 Drawing Sheets

(51) Int. Cl.
  *B29C 64/268* (2017.01)
  *B29C 64/35* (2017.01)
  *B33Y 10/00* (2015.01)
  *B33Y 40/20* (2020.01)
  *B33Y 50/02* (2015.01)
  *B29L 31/00* (2006.01)

(52) U.S. Cl.
  CPC .............. *B29C 64/35* (2017.08); *B33Y 10/00* (2014.12); *B33Y 40/20* (2020.01); *B33Y 50/02* (2014.12); *B29L 2031/753* (2013.01)

(56) References Cited

U.S. PATENT DOCUMENTS

| | | |
|---|---|---|
| 6,497,574 B1 | 12/2002 | Miller |
| 6,957,118 B2 | 10/2005 | Kopelman et al. |
| 6,976,627 B1 | 12/2005 | Culp et al. |
| 7,092,784 B1 | 8/2006 | Simkins |
| 7,220,124 B2 | 5/2007 | Taub et al. |
| 7,236,842 B2 | 6/2007 | Kopelman et al. |
| 7,245,977 B1 | 7/2007 | Simkins |
| 7,261,533 B2 | 8/2007 | Wrosz et al. |
| 7,335,024 B2 | 2/2008 | Wen |
| 7,384,266 B2 | 6/2008 | Wen |
| 7,435,084 B2 | 10/2008 | Liu et al. |
| 7,472,789 B2 | 1/2009 | Wu et al. |
| 7,476,100 B2 | 1/2009 | Kuo |
| 7,481,647 B2 | 1/2009 | Sambu et al. |
| 7,604,181 B2 | 10/2009 | Culp et al. |
| 7,641,828 B2 | 1/2010 | DeSimone et al. |
| 7,648,360 B2 | 1/2010 | Kuo |
| 7,674,422 B2 | 3/2010 | Kuo |
| 7,711,447 B2 | 5/2010 | Lu et al. |
| 7,748,199 B2 | 7/2010 | Sankaran et al. |
| 7,802,987 B1 | 9/2010 | Phan |
| 7,819,659 B2 | 10/2010 | Wen |
| 7,831,322 B2 | 11/2010 | Liu et al. |
| 7,840,373 B2 | 11/2010 | Culp et al. |
| 7,922,490 B2 | 4/2011 | Wen |
| 7,957,824 B2 | 6/2011 | Boronvinskih et al. |
| 8,019,465 B2 | 9/2011 | Spiridonov et al. |
| 8,030,588 B2 | 10/2011 | Culp et al. |
| 8,087,932 B2 | 1/2012 | Liu |
| 8,636,513 B2 | 1/2014 | Wen |
| 8,765,031 B2 | 7/2014 | Li et al. |
| 8,776,391 B1 | 7/2014 | Kaza et al. |
| 9,108,338 B2 | 8/2015 | Sirovskiy et al. |
| 9,403,238 B2 | 8/2016 | Culp |
| 9,943,386 B2 | 4/2018 | Webber et al. |
| 9,943,991 B2 | 4/2018 | Tanugula et al. |
| 10,336,102 B2 | 7/2019 | Cole |
| 10,495,973 B2 | 12/2019 | Cole |
| 10,783,629 B2 | 9/2020 | Parpara et al. |
| 10,888,395 B2 | 1/2021 | Kopelman |
| 11,189,021 B2 | 11/2021 | Shah et al. |
| 11,295,444 B2 | 4/2022 | Cherkas et al. |
| 11,420,362 B2 | 8/2022 | Mojdeh et al. |
| 11,440,243 B1 | 9/2022 | Joyce |
| 11,511,485 B2 | 11/2022 | Mojdeh et al. |
| 11,534,277 B2 | 12/2022 | Chavez et al. |
| 2004/0243361 A1 | 12/2004 | Steuben et al. |
| 2006/0093982 A1 | 5/2006 | Wen |
| 2006/0093987 A1 | 5/2006 | Wen |
| 2006/0093993 A1 | 5/2006 | Wen |
| 2006/0127850 A1 | 6/2006 | Wen |
| 2006/0127857 A1 | 6/2006 | Liu et al. |
| 2006/0127858 A1 | 6/2006 | Wen |
| 2006/0127859 A1 | 6/2006 | Wen |
| 2006/0127860 A1 | 6/2006 | Wen |
| 2006/0172250 A1 | 8/2006 | Wen |
| 2006/0199145 A1 | 9/2006 | Liu et al. |
| 2007/0092853 A1 | 4/2007 | Liu et al. |
| 2007/0168152 A1 | 7/2007 | Matov et al. |
| 2007/0243502 A1 | 10/2007 | Wen |
| 2008/0083348 A1 | 4/2008 | Kuo et al. |
| 2009/0148814 A1 | 6/2009 | Li et al. |
| 2018/0297290 A1 | 10/2018 | Eyal et al. |
| 2020/0078137 A1 | 3/2020 | Chen et al. |
| 2020/0214801 A1 | 7/2020 | Wang et al. |
| 2020/0290262 A1 | 9/2020 | Aguilar Mendez et al. |
| 2021/0030516 A1 | 2/2021 | O'Leary et al. |
| 2021/0170676 A1 | 6/2021 | Kitchen et al. |
| 2021/0276248 A1 | 9/2021 | Boehm et al. |
| 2022/0033552 A1 | 2/2022 | Oishi |
| 2022/0347932 A1 | 11/2022 | Gmeiner et al. |

OTHER PUBLICATIONS

Sekonic, "Lab-type Torsional Oscillation-type Viscometer VM-10A/100A Series", https://www.sekonic.co.jp/english/product/viscometer/download/pdf/catalog/catalog_VM-10A.pdf, 2011, 2 pages.

Sekonic, "Vibration Type Viscometer for Lab VM-10A", https://www.sekonic.co.jp/english/product/viscometer/vm/vm_series.html. 2020, 3 pages.

* cited by examiner

CONTROL SYSTEMS FOR ADDITIVE MANUFACTURING AND ASSOCIATED METHODS

The present application claims the benefit of priority to U.S. Provisional Application No. 63/268,425, filed Feb. 23, 2022, which is incorporated by reference herein in its entirety.

TECHNICAL FIELD

The present technology generally relates to manufacturing systems, and in particular, to control systems for additive manufacturing and associated methods.

BACKGROUND

Additive manufacturing encompasses a variety of technologies that involve building up 3D objects from multiple layers of material. However, conventional additive manufacturing systems and devices may be prone to issues that compromise the efficiency, quality, and scalability of the printing process. For example, layer delamination (failure of a printed layer to adhere to the build platform or the previous printed layer) may reduce the quality of the final printed object or even cause print failure. Delaminated material may also cause clogging, streaking, or otherwise interfere with system operation. As another example, unintended changes in the temperature or viscosity of the material may detrimentally affect the accuracy of the additive manufacturing process, as well as the composition and mechanical properties of the final printed object. Conventional additive manufacturing systems and devices may lack the capability to detect and mitigate such issues, and may therefore be unsuitable for large-scale production of printed objects.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

Figure 1A:
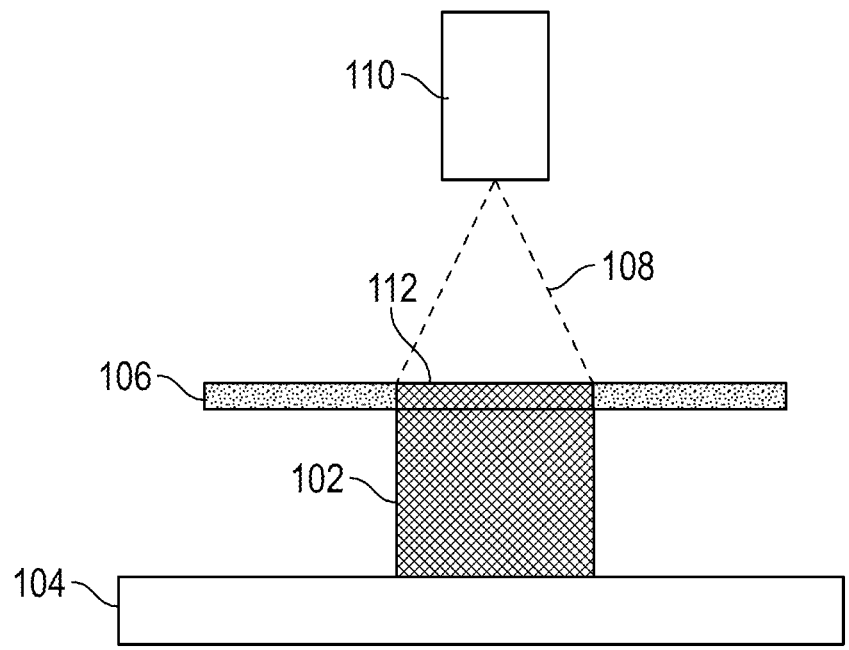
FIG. 1A is a partially schematic diagram providing a general overview of an additive manufacturing process, in accordance with embodiments of the present technology.

The present technology relates to control systems for additive manufacturing and associated methods. In some embodiments, for example, a system for producing an additively manufactured object includes a printer assembly (e.g., a stereolithography or digital light processing device) configured to form an object on a build platform from a curable material (e.g., a polymeric resin) using an additive manufacturing process. The system can also include at least one sensor configured to monitor remaining material conveyed away from the build platform. During operation, the system can apply energy via the printer assembly to the curable material according to a set of print parameters to form a cured material layer on the build platform and/or object. Subsequently, the system can use the sensor(s) to detect whether the remaining material conveyed away from the build platform includes a portion of the cured material layer that has separated from the build platform and/or object. If cured material is detected, the system can adjust the print parameters to improve adhesion of subsequent layers of cured material to the build platform and/or object. The system can then apply energy according to the adjusted print parameters to print subsequent cured material layers.

As another example, a method for producing an additively manufactured object can include determining a viscosity of a curable material conveyed on a carrier film of a printer assembly, and determining a temperature of the curable material, based on the viscosity. The method can also include adjusting one or more heat sources configured to heat the curable material, based on the temperature. For instance, the output of the heat sources can be controlled such that the temperature of the uncured material is maintained within a target range. The method can then include applying energy to the curable material to form a portion of the additively manufactured object.

The present technology can provide numerous advantages over conventional additive manufacturing techniques. For example, the systems herein can automatically determine when printing issues such as layer delamination and/or temperature fluctuations have occurred, without requiring a human operator to be present to monitor the entire manufacturing process. Additionally, printing issues can be detected at an earlier stage in the process, thus increasing the likelihood that the issue can be corrected without requiring reprinting, and decreasing the amount of wasted material if the object needs to be reprinted. Moreover, the systems herein can automatically and dynamically adjust the operational parameters of the printer assembly (e.g., exposure time, power density, heating) via closed loop control to correct any detected issues and/or reduce the likelihood of printing defects in subsequent layers, thus enhancing print quality, efficiency, and scalability. The feedback from these adjustments can be used to improve future manufacturing processes.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

As used herein, the terms "vertical," "lateral," "upper," and "lower" can refer to relative directions or positions of features of the embodiments disclosed herein in view of the orientation shown in the Figures. For example, "upper" or "uppermost" can refer to a feature positioned closer to the top of a page than another feature. These terms, however, should be construed broadly to include embodiments having other orientations, such as inverted or inclined orientations where top/bottom, over/under, above/below, up/down, and left/right can be interchanged depending on the orientation.

The headings provided herein are for convenience only and do not interpret the scope or meaning of the claimed present technology. Embodiments under any one heading may be used in conjunction with embodiments under any other heading.

I. Control Systems for Additive Manufacturing and Associated Methods

FIG. 1A is a partially schematic diagram providing a general overview of an additive manufacturing process, in accordance with embodiments of the present technology. Additive manufacturing (also referred to herein as "3D printing") includes a variety of technologies which fabricate 3D objects (e.g., dental appliances such as aligners, palatal expanders, retainers, attachment placement devices, attachments, oral sleep apnea appliances, and mouth guards) directly from digital models through an additive process. In some embodiments, additive manufacturing includes depositing a precursor material (e.g., a polymeric resin) onto a build platform. The precursor material can be cured, polymerized, melted, sintered, fused, and/or otherwise solidified to form a portion of the object and/or to combine the portion with previously formed portions of the object. In some embodiments, the additive manufacturing techniques provided herein build up the object geometry in a layer-by-layer fashion, with successive layers being formed in discrete build steps. Alternatively or in combination, the additive manufacturing techniques described herein can allow for continuous build-up of an object geometry.

For example, in the embodiment of FIG. 1A, an object 102 is fabricated on a build platform 104 from a series of cured material layers, with each layer having a geometry corresponding to a respective cross-section of the object 102. To fabricate an individual object layer, a layer of curable material 106 (e.g., polymeric resin) is brought into contact with the build platform 104 (when fabricating the first layer of the object 102) or with the previously formed portion of the object 102 on the build platform 104 (when fabricating subsequent layers of the object 102). Energy 108 (e.g., light) from an energy source 110 (e.g., a projector or light engine) is then applied to the curable material 106 to form a cured material layer 112 on the build platform 104 or on the object 102. The remaining curable material 106 can then be moved away from the build platform 104 (e.g., by lowering the build platform 104, by raising the curable material 106, by moving the build platform 104 laterally, and/or by moving the curable material 106 laterally), thus leaving the cured material layer 112 in place on the build platform 104 and/or object 102. The fabrication process can then be repeated with a fresh layer of curable material 106 to build up the next layer of the object 102.

Figure 1B:
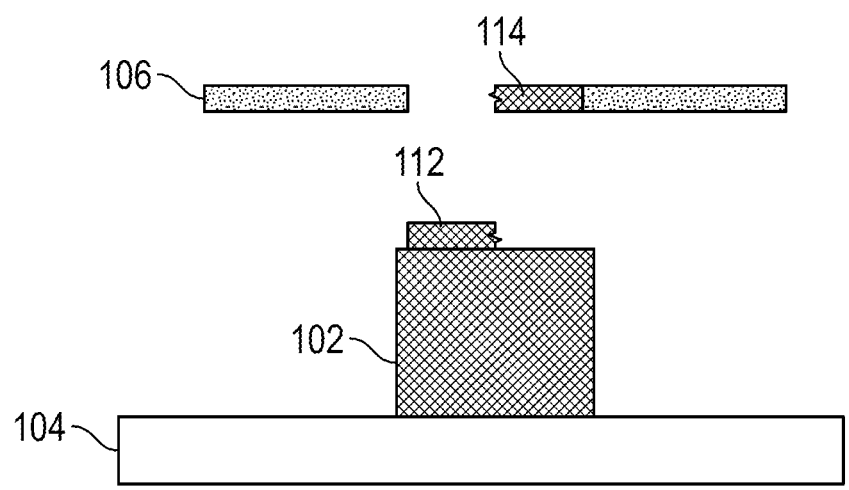
FIG. 1B is a partially schematic diagram illustrating an example of a printing defect that may occur during the additive manufacturing process of FIG. 1A.

FIG. 1B is a partially schematic diagram illustrating an example of a printing defect that may occur during the additive manufacturing process of FIG. 1A. As shown in FIG. 1B, if the cured material layer 112 is not sufficiently adhered to the object 102, when the build platform 104 is moved away from the curable material 106, a portion 114 of the cured material layer 112 may delaminate from the object 102 and be lifted off along with the remaining curable material 106. In some instances, the entire cured material layer 112 may separate from the object 102. This type of printing defect, also known as "layer delamination" or "layer separation," typically occurs when the cured material layer 112 is not sufficiently bonded to the object 102. Layer delamination may also occur between the cured material layer 112 and the build platform 104 when forming the initial layers of the object 102. Layer delamination may be caused by various factors, such as insufficient and/or incomplete curing (e.g., due to exposure time being too short, the energy and/or power density being too low), the object geometry (e.g., adhesion may be impaired if the surface area of the printed feature is too small), and/or the properties of the curable material 106 (e.g., thickness, viscosity).

Layer delamination may cause the actual geometry of the printed object to deviate from the desired object geometry, thus compromising print accuracy and quality, as well as the mechanical properties of the object. If the defect is too severe, the entire object may need to be discarded and reprinted, thus wasting material, increasing costs, and prolonging manufacturing time. Additionally, the cured material that is lifted off along with the curable material may be carried into other portions of the additive manufacturing device, which can lead to clogging, streaking, and/or other malfunctions. In some instances, a human operator may need to stop device operation to clean out the cured material, thus further reducing manufacturing efficiency.

Other types of printing issues may also arise during the additive manufacturing process of FIG. 1A. For example, in some embodiments, the curable material 106 is maintained at a particular temperature range to control the properties (e.g., viscosity) and/or composition of the curable material 106. If the temperature is too high, volatile components within the curable material 106 may evaporate, thus causing undesirable changes in the composition of the curable material 106. If the temperature is too low, the curable material 106 may be too viscous for additive manufacturing. Changes in the viscosity of the curable material 106 can affect the kinetics of the curing process, which can alter the dimensional accuracy and/or mechanical properties of the cured material layer 112 and/or the final object 102.

Figure 2:
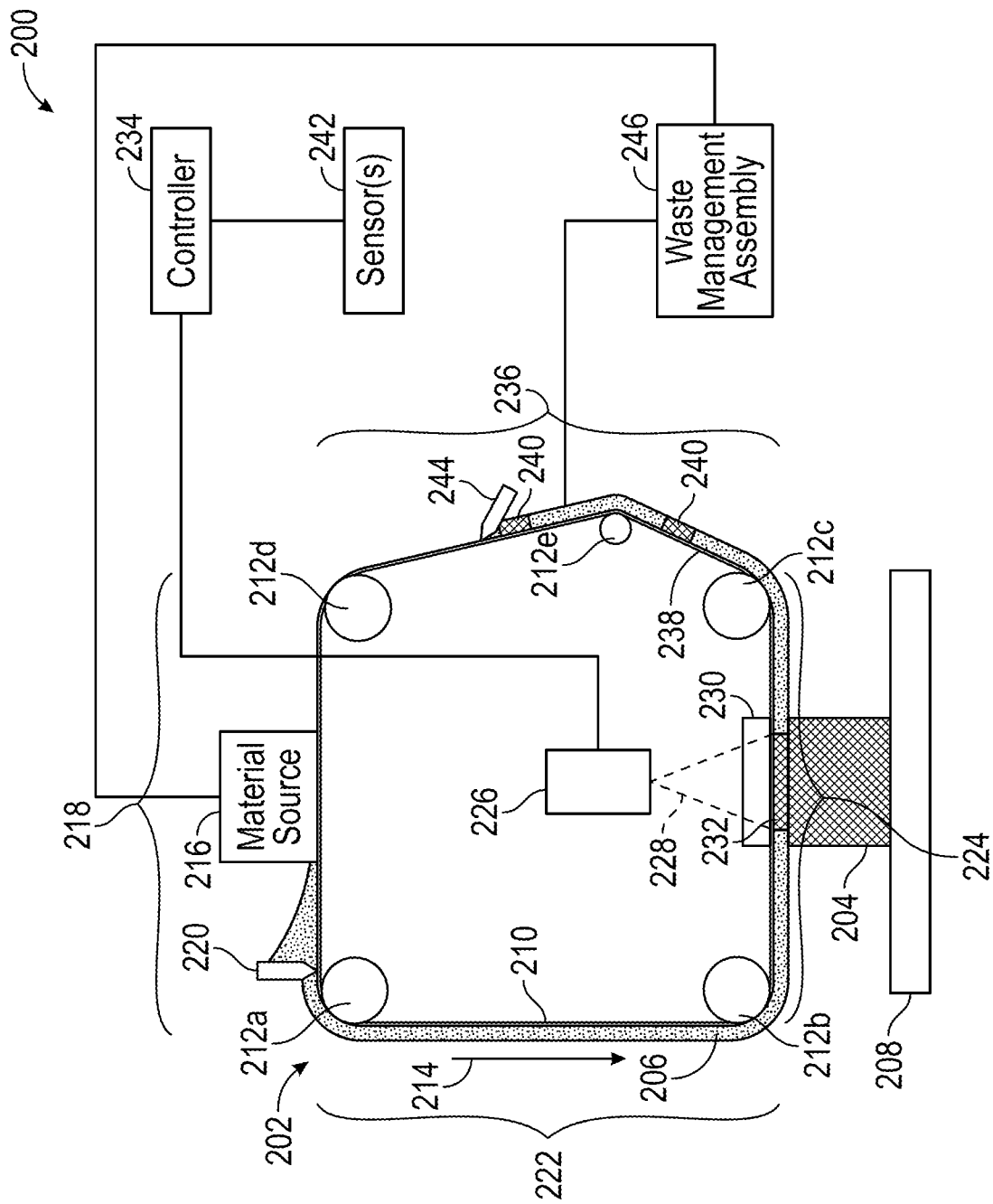
FIG. 2 is a partially schematic diagram of a system for additive manufacturing configured in accordance with embodiments of the present technology.

FIG. 2 is a partially schematic diagram of a system 200 for additive manufacturing configured in accordance with embodiments of the present technology. As described in detail below, the system 200 is configured to mitigate printing issues, such as layer delamination and/or other printing defects. For example, the system 200 can detect when a printing defect has occurred, and then adjust one or more print parameters to address the defect. As another example, the system 200 can detect whether conditions that might lead to a printing defect and/or other printing issues are present (e.g., insufficient heating of the material and/or changes in viscosity of the material), and can adjust one or more operational parameters to correct the condition. In some embodiments, the detection and adjustment are performed automatically by the system 200 with little or no intervention from a human operator, thus improving the reliability and scalability of the additive manufacturing process.

The system 200 includes a printer assembly 202 configured to fabricate an additively manufactured object 204 ("object 204") using any of the additive manufacturing processes described herein. The printer assembly 202 is configured to form the object 204 on a build platform 208 (e.g., a tray, plate, film, sheet, print bed, or other planar substrate) by applying energy to a curable material 206 (e.g., a polymeric resin or other solidifiable precursor material). In the illustrated embodiment, the printer assembly 202 includes a carrier film 210 configured to deliver the curable material 206 to the build platform 208. The carrier film 210 can be a flexible loop of material having an outer surface and an inner surface. The outer surface of the carrier film 210 can adhere to and carry a thin layer of the curable material 206. The inner surface of the carrier film 210 can contact one or more rollers 212*a*-212*e* that rotate to move the carrier film 210 in a continuous loop trajectory, e.g., along the direction indicated by arrow 214.

The printer assembly 202 can also include a material source 216 (shown schematically) configured to apply the curable material 206 to the carrier film 210 at a deposition zone 218. In the illustrated embodiment, the material source 216 is located at the upper portion of the printer assembly 202, and the deposition zone 218 is an upper horizontal segment of the carrier film 210 between rollers 212*a* and 212*d*. In other embodiments, however, the material source 216 and/or deposition zone 218 can be at different locations in the printer assembly 202. The material source 216 can include nozzles, ports, reservoirs, etc., that deposit the curable material 206 onto the outer surface of the carrier film 210. The printer assembly 202 can also include one or more blades 220 (e.g., doctor blades, recoater blades) that smooth the deposited curable material 206 into a relatively thin, uniform layer. For example, the curable material 206 can be formed into a layer having a thickness within a range from 100 microns to 500 microns, 200 microns to 300 microns, or any other desired thickness.

The curable material 206 can be conveyed by the carrier film 210 toward the build platform 208. In some embodiments, the curable material 206 is transported through a pre-print zone 222 downstream of the deposition zone 218. The pre-print zone 222 can be a vertical segment of the carrier film 210 between rollers 212*a* and 212*b*. Optionally, the carrier film 210 can include one or more angled segments within the pre-print zone 222.

The build platform 208 can be located proximate to a print zone 224 of the carrier film 210. In the illustrated embodiment, the build platform 208 is located below the printer assembly 202, and the print zone 224 is a lower horizontal segment of the carrier film 210 between rollers 212*b* and 212*c*. In other embodiments, however, the build platform 208 and/or print zone 224 can be positioned at different locations in the printer assembly 202. The distance between the carrier film 210 and build platform 208 can be adjustable so that the curable material 206 at the print zone 224 can be brought into direct contact with the surface of the build platform 208 (when printing the initial layer of the object 204) or with the surface of the object 204 (when printing subsequent layers of the object 204). For example, the build platform 208 can include or be coupled to a motor (not shown) that raises and/or lowers the build platform 208 to the desired height during the manufacturing process. Alternatively or in combination, the printer assembly 202 can include or be coupled to a motor (not shown) that raises and/or lowers the printer assembly 202 relative to the build platform 208.

The printer assembly 202 includes an energy source 226 (e.g., a projector or light engine) that outputs energy 228 (e.g., light, such as UV light) having a wavelength configured to partially or fully cure the curable material 206. The carrier film 210 can be partially or completely transparent to the wavelength of the energy 228 to allow the energy 228 to pass through the carrier film 210 and onto the portion of the curable material 206 above the build platform 208. Optionally, a transparent plate 230 can be disposed between the energy source 226 and the carrier film 210 to guide the carrier film 210 into a specific position (e.g., height) relative to the build platform 208. During operation, the energy 228 can be patterned or scanned in a suitable pattern onto the curable material 206, thus forming a layer of cured material 232 onto the build platform 208 and/or on a previously formed portion of the object 204. The geometry of the cured material 232 can correspond to the desired cross-sectional geometry for the object 204. The parameters for operating the energy source 226 (e.g., exposure time, exposure pattern, exposure wavelength, energy density, power density) can be set based on instructions from a controller 234, as described in further detail below.

In some embodiments, the energy 228 is applied to the curable material 206 while the carrier film 210 moves to circulate the curable material 206 through the print zone 224. To maintain zero or substantially zero relative velocity between the curable material 206 and the build platform 208, the printer assembly 202 can concurrently move horizontally relative to the build platform 208 opposite the direction of the motion of the carrier film 210 at the print zone 224. The energy 228 output by the energy source 226 can be coordinated with the movement of the carrier film 210 and build platform 208 so that the layer of cured material 232 is formed with the correct geometry. For example, the energy source 226 can be a scrolling light engine (e.g., a scrolling digital light processing engine) that outputs an energy pattern that varies over time to match the motion of the printer assembly 202 and carrier film 210. In other embodiments, however, the printer assembly 202 can be a stationary device that does not move relative to the build platform 208 while the energy 228 is being applied to the curable material 206.

The newly formed layer of cured material 232 can be separated from the carrier film 210 and the remaining curable material 206 at or after the print zone 224. In some embodiments, the separation occurs at least in part due to peel-off forces produced by the carrier film 210 wrapping around the roller 212*c* immediately downstream of the print zone 224. Peel-off forces can alternatively or additionally be provided by movements of the build platform 208 and/or printer assembly 202 (e.g., raising the printer assembly 202 away from the build platform 208, moving the printer assembly 202 laterally away from the build platform 208); use of a roller, blade, or other mechanism to facilitate separation of the cured material 232 from the carrier film 210; and/or other parameters of the printer assembly such as movement speed of the carrier film 210.

The remaining curable material 206 can be conveyed by the carrier film 210 away from the build platform 208, and into a post-print zone 236 downstream of the print zone 224. The post-print zone 236 can be the segment of the carrier film 210 between rollers 212c and 212d. Optionally, at least one roller 212e downstream of the print zone 224 can be horizontally offset from the other rollers 212c, 212d such that the carrier film 210 includes an angled segment 238 within the post-print zone 236. The angled segment 238 can apply tension to the carrier film 210 at the print zone 224 to provide an additional peel-off force that enhances separation of the cured material 232 from the remaining curable material 206. For example, the angle of the angled segment 238 (e.g., as measured relative to vertical) can be at least 5°, 10°, 15°, 20°, 25°, 30°, 35°, 40°, 45°, 50°, 55°, or 60°. In other embodiments, however, the angled segment 238 is optional and can be omitted, such that the segment of the carrier film 210 within the post-print zone 236 vertical or substantially vertical.

The remaining curable material 206 conveyed away from the build platform 208 can be circulated by the carrier film 210 back toward the deposition zone 218. Optionally, some or all of the curable material 206 can be removed from the carrier film 210 by a blade 244 and diverted into a waste management assembly 246 (shown schematically), as described further below. At the deposition zone 218, the material source 216 can apply additional curable material 206 onto the carrier film 210 and/or smooth the curable material 206 to re-form a uniform layer of curable material 206 on the carrier film 210. The curable material 206 can then be recirculated back through the pre-print zone 222, and then to the print zone 224 and build platform 208 to fabricate the subsequent layer of the object 204. This process can be repeated to iteratively build up individual object layers on the build platform 208 until the object 204 is complete. The object 204 and build platform 208 can then be removed from the system 200 for post-processing.

Optionally, the printer assembly 202 can be configured to produce the object 204 via a high temperature lithography process utilizing a highly viscous resin. In such embodiments, the printer assembly 202 can include one or more heat sources (heating plates, infrared lamps, etc. —not shown) for heating the curable material 206 to lower the viscosity to a range suitable for additive manufacturing. The heat sources can be positioned near or in direct contact with the carrier film 210 to heat the curable material 206 supported by the carrier film 210. The heat sources can be located at any suitable portion of the printer assembly 202, such as on or within the material source 216, on or within the build platform 208, at the deposition zone 218, at the pre-print zone 222, at the print zone 224, at the post-print zone 236 (e.g., at the angled segment 238), or combinations thereof.

The controller 234 (shown schematically) is operably coupled to the printer assembly 202 (e.g., to the build platform 208, rollers 212a-212e, material source 216, and/or energy source 226) to control the operation thereof. The controller 234 can be or include a computing device including one or more processors and memory storing instructions for performing the additive manufacturing operations described herein. For example, the controller 234 can receive a digital 3D model of the object 204 to be fabricated, determine a plurality of object cross-sections to build up the object 204 from the curable material 206, and can transmit instructions to the energy source 226 to apply energy 228 to the curable material 206 to form the object cross-sections. As previously discussed, the controller 234 can control various operational parameters of the energy source 226, such as the exposure time, exposure pattern, exposure wavelength, energy density, power density, and/or other parameters affecting the printing process. Optionally, the controller 234 can also determine and control other operational parameters, such as the positioning of the build platform 208 (e.g., height) relative to the carrier film 210, the movement speed and/or direction of the carrier film 210, the rotational speed and/or direction of the rollers 212a, the amount of curable material 206 deposited by the material source 216, the thickness of the curable material 206 on the carrier film 210, and/or the amount of heating applied to the curable material 206. These operational parameters may also be referred to herein as the "print parameters" of the system 200.

As previously discussed, during the printing process, some or all of the cured material 232 ("cured element 240") may fail to adhere properly to the object 204 and/or build platform 208, and thus may peel off from the surface of the object 204 and/or build platform 208 as the surrounding curable material 206 moves out of the print zone 224 and/or away from the build platform 208. Thus, the remaining material conveyed away from the print zone 224 may include one or more cured elements 240 along with curable material 206.

In some embodiments, the system 200 is configured to monitor the material exiting the print zone 224 to detect the presence of any cured elements 240, which may indicate that printing defects such as layer delamination have occurred. For example, the system 200 can include one or more sensors 242 (shown schematically) positioned at or near the post-print zone 236 of the carrier film 210 (in such embodiments, the post-print zone 236 may also be referred to herein as a "monitoring zone" of the system 200). As discussed above, the post-print zone 236 can encompass one or more segments of the carrier film 210 (e.g., angled segments and/or vertical segments) between the print zone 224 and the deposition zone 218. The sensors 242 can be operably coupled to the controller 234 via wired and/or wireless connections to transmit sensor data thereto. The controller 234 can analyze the sensor data produced by the sensors 242 to determine whether there are any cured elements 240 within the material at the post-print zone 236.

Optionally, at least some of the sensors 242 can be used for other operations of the system 200, as an alternative or in addition to monitoring the post-print zone 236 for cured elements 240. For example, one or more of the sensors 242 can be configured to monitor the characteristics of the curable material 206 at the deposition zone 218, pre-print zone 222, and/or print zone 224, e.g., to determine whether the curable material 206 is in an appropriate state for additive manufacturing. In some embodiments, one or more of the sensors 242 are configured to monitor the temperature and/or viscosity of the curable material 206, and the controller 234 uses the sensor data to determine whether the heating of the curable material 206 should be adjusted, as described further below in connection with FIGS. 7-9.

The system 200 can include any suitable number of sensors 242, such as one, two, three, four, five, ten, twenty, or more sensors 242. The sensors 242 can include different sensor types, including, but not limited to, force sensors, strain sensors, distance sensors (e.g., ultrasonic sensors, time-of-flight sensors, rangefinders), position sensors, angle sensors, imaging devices (e.g., line scan cameras, 2D cameras), optical sensors (e.g., refractometers, spectrophotometers), temperature sensors, viscosity sensors, or combinations thereof. Additional examples and details of sensors 242 that may be included in the system 200 are described further below with respect to FIGS. 3A-4D, 7, and 8.

As shown in FIG. 2, the system 200 can also include at least one blade 244 at the post-print zone 236. The blade 244 can be a doctor blade, recoater blade, or other suitable device that can be positioned in contact with the surface of the carrier film 210 at the post-print zone 236. In some embodiments, the blade 244 is configured to remove most or all of the curable material 206, any cured elements 240, and/or any other undesirable contaminants or residue off the carrier film 210, e.g., via wiping, scraping, etc. The material removed by the blade 244 can be redirected into the waste management assembly 246 for filtration, cleaning, storage, and/or recirculation to the material source 216, as discussed further below with respect to FIG. 5. Optionally, at least one of the sensors 242 can be operably coupled to the blade 244 to measure a state of the blade (e.g., position, orientation, applied force), which may be indicative of the presence of cured elements 240, as described below. Additionally, some or all of the sensors 242 can be used to monitor whether the blade 244 has successfully removed the cured elements 240 from the carrier film 210. If the sensor data indicates that one or more cured elements 240 still remain on the carrier film 210 downstream of the blade 244, the controller 234 can instruct the printer assembly 202 to rotate the carrier film 210 past the blade 244 one or more times in a non-printing state for further cleaning, and/or can notify an operator that manual intervention is needed.

Although FIG. 2 illustrates a single blade 244, in other embodiments, the system 200 can include a greater number of blades 244, such as two, three, four, five, or more blades 244. In such embodiments, the blades 244 can be spaced apart from each other at different locations along the post-print zone 236. The use of multiple blades 244 may improve cleaning of the carrier film 210 and/or can increase the likelihood that any cured elements 240 entering the post-print zone 236 are removed. Additional details of the blade (s) 220 are described below with respect to FIGS. 3A and 3B.

In some embodiments, if the controller 234 detects the presence of cured elements 240 in the material at the post-print zone 236, the controller 234 can adjust one or more print parameters of the system 200 to reduce the likelihood of layer delamination and/or other printing defects when printing subsequent layers of the object 204. For example, the adjustment can be configured to improve adhesion of the cured material 232 to the object 204 and/or build platform 208, such as by increasing the amount and/or depth of curing to strengthen the bonding between the cured material 232 and underlying object or build platform surface. The adjustments can include, for example, increasing the exposure time that the energy 228 is applied to the curable material 206, increasing the power and/or energy density of the energy 228 produced by the energy source 226, increasing a temperature of the curable material 206 at or near the deposition zone 218, increasing a temperature of the curable material 206 at or near the pre-print zone 222, increasing a temperature of the curable material 206 at or near the print zone 224, or suitable combinations thereof. The controller 234 can adjust one parameter at a time, or can adjust multiple parameters concurrently. In some embodiments, the adjustments are applied to the entire object layer to be printed, e.g., the controller 234 increases the exposure time and/or power density uniformly across the whole layer. In other embodiments, however, the adjustments can be selectively applied only to those portions of the object layer that exhibited printing defects and/or are determined to be more susceptible to printing defects. For example, if the sensor data shows that delamination occurred primarily at the edges of the layer, the controller 234 can increase the exposure time and/or power density at the edges, while maintaining the original exposure time and/or power density for the remaining portions of the layer.

The controller 234 can determine the appropriate adjustments to be made in various ways. For example, the controller 234 can adjust one or more parameters according to preset instructions (e.g., stored in lookup tables, databases, or other suitable data structures). In some embodiments, the controller 234 increases or decreases a parameter by a predetermined increment until the printing defect is resolved (e.g., increasing the exposure time by x seconds each print cycle until layer delamination is no longer detected). Optionally, the controller 234 can adjust a parameter by a variable increment based on the severity of the detected defect (e.g., a larger adjustment is used if more extensive layer delamination is detected), the number of previous attempts to resolve the defect (e.g., a larger adjustment is used if previous adjustments failed to correct the issue), and/or other suitable factors. Alternatively or in combination, the controller 234 can determine the adjustment using a machine learning algorithm that is configured to identify the adjustment that is likely to resolve a particular defect. In such embodiments, the machine learning algorithm can be trained on data obtained from previous printing processes.

In some embodiments, once the controller 234 has determined which adjustment(s) should be made, the controller 234 transmits signals to the appropriate component(s) of the system 200 (e.g., the energy source 226, material source 216, rollers 212a-212e, heat sources) via wired and/or wireless connections to effectuate the desired adjustments. For example, the controller 234 can send instructions to the energy source 226 to modify the exposure time, power and/or energy density, etc., of the applied energy 228. Subsequently, the controller 234 can instruct the printer assembly 202 to reprint the object layer that experienced the printing defect (if the defect was severe) or to print the next object layer (if the defect was relatively minor), using the adjusted parameters.

The controller 234 can then monitor the outcome of the print cycle via the sensors 242. If the printing defect was successfully resolved (e.g., no more cured elements 240 are detected in the post-print zone 236), the controller 234 can instruct the printer assembly 202 to continue fabricating the rest of the object 204 using the adjusted parameters. If the printing defect was not resolved (e.g., cured elements 240 continue to be detected in the post-print zone 236), the controller 234 can make further adjustments to the operational parameters. The monitoring and adjustment process can be repeated throughout the additive manufacturing process until the object 204 is completed. Optionally, if the controller 234 determines that the printing defects are sufficiently severe and/or is unable to resolve the printing defects via automated adjustments, the controller 234 can output an alert notifying an operator that manual intervention is needed.

In some embodiments, the controller 234 records the history of the entire additive manufacturing process, including the print outcome for each object layer, such as whether any printing defects occurred while forming the layer and any adjustments that were made to correct the defects. This information can be used to provide feedback for future additive manufacturing processes, e.g., whether certain object designs and/or print parameters consistently resulted in printing defects, whether certain adjustments are more likely to successfully mitigate defects than other adjustments, etc. Additionally, this information can be used for tracing purposes in case there are any issues with downstream processing and/or use of the object.

FIGS. 3A-4D illustrate various sensor configurations for the system 200 of FIG. 2, in accordance with embodiments of the present technology. Any of the embodiments described in connection with FIGS. 3A-4D can be combined with each other and/or incorporated into the system 200 of FIG. 2 (e.g., as part of the sensor(s) 242).

Figure 3B:
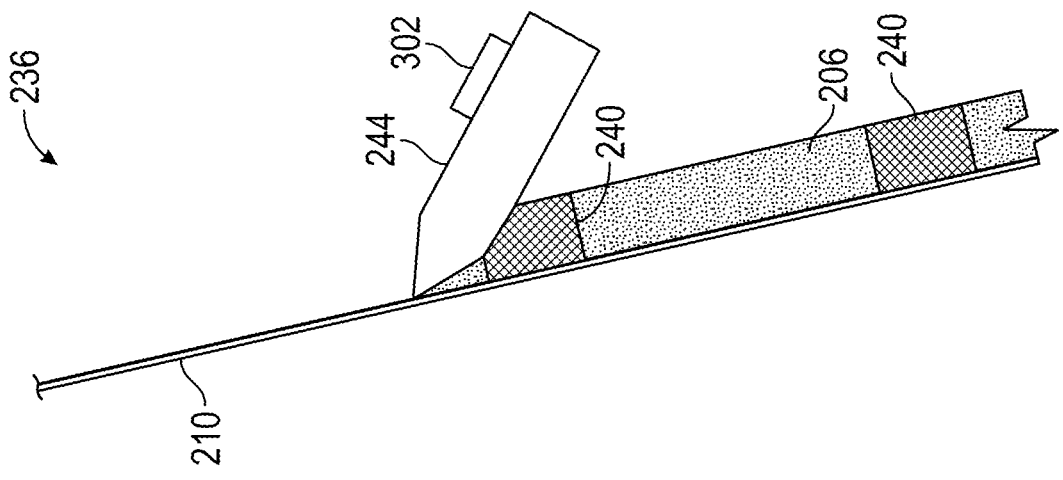
FIG. 3B is a closeup side view of the blade of FIG. 3A coupled to a sensor, in accordance with embodiments of the present technology.
Figure 3A:
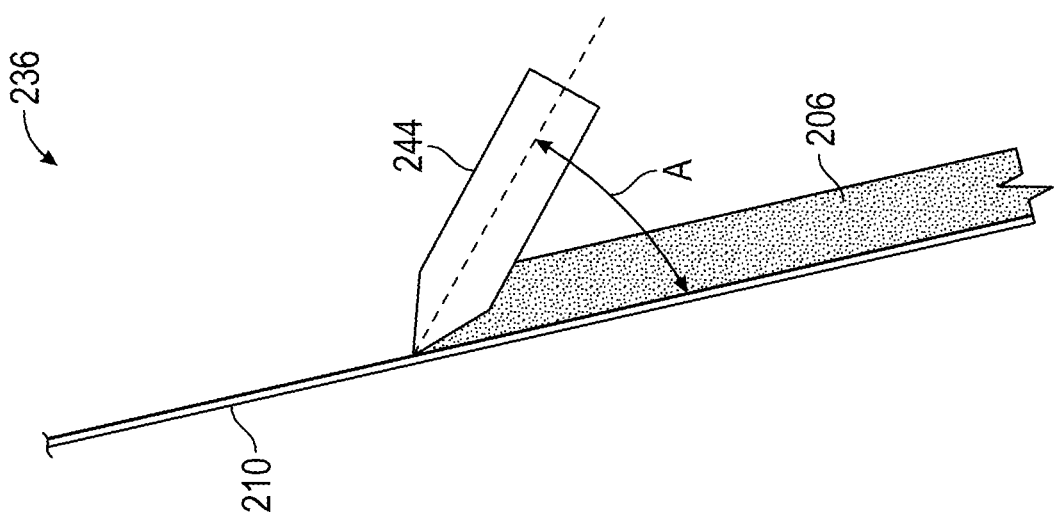
FIG. 3A is a closeup side view of a blade of the system of FIG. 2, in accordance with embodiments of the present technology.

FIGS. 3A and 3B are closeup side views of the blade 244 of the system 200 of FIG. 2, in accordance with embodiments of the present technology. Referring first to FIG. 3A, as previously described, the blade 244 can be a doctor blade, recoater blade, etc., that is configured to be positioned near the carrier film 210 at the post-print zone 236 of the system 200. The blade 244 can be releasably coupled to a holder (not shown) so the blade 244 can be removed by an operator for cleaning, maintenance, replacement, etc. The blade 244 can be made of any suitable material, such as a metal (e.g., stainless steel), a polymer, a ceramic, a composite, or combinations thereof. Although FIG. 3A depicts the blade 244 as having a tapered, triangular tip, in other embodiments, the blade 244 can have a different shape, such as a rounded tip, a jagged tip, or any other suitable shape known to those of skill in the art.

In operation, the blade 244 can be positioned adjacent or near the carrier film 210 in a configuration for scraping material (e.g., curable material 206, cured elements 240, other residue) from the surface of the carrier film 210. Although FIG. 3A depicts the blade 244 as being positioned in contact with the outer surface of the carrier film 210, in other embodiments, the blade 244 can be spaced apart from the outer surface of the carrier film 210, such as by a height of at least 1 mm, 900 µm, 800 µm, 700 µm, 600 µm, 500 µm, 400 µm, 300 µm, 200 µm, 100 µm, 75 µm, 50 µm, 25 µm, or 10 µm. The angle A of the blade 244 (e.g., as measured from the outer surface of the carrier film 210 upstream of the blade 244) can be less than or equal to 40°, 35°, 30°, 25°, 20°, 15°, or 10°. In some embodiments, the blade 244 is a fixed blade that is maintained at a stationary position and angle A during operation. In other embodiments, however, the blade 244 can be a movable blade such that the position and/or angle A are adjustable. The adjustments can be made manually by an operator, automatically by an actuation mechanism (e.g., gears, springs, motors, etc. —not shown), or suitable combinations thereof. For example, the adjustment mechanism can be operably coupled to the controller 234 (FIG. 2) so the controller 234 can automatically control the position and/or angle A of the blade 244. In some embodiments, if the controller 234 detects that the blade 244 is not effectively cleaning material from the carrier film 210, the controller 234 can modify the position and/or angle A to improve cleaning efficacy.

Referring next to FIG. 3B, the blade 244 can be coupled to or otherwise associated with at least one sensor 302 configured to detect the presence of cured elements 240 on or within the curable material 206. For example, the sensor 302 can be or include a force sensor configured to measure an amount of force applied to the blade 244 by the material on the carrier film 210. In some embodiments, the cured element 240 has a higher stiffness and/or viscosity than the curable material 206. Accordingly, if the force on the blade 244 suddenly increases (e.g., above a predetermined threshold), this may indicate that a cured element 240 has contacted the blade 244. In some embodiments, the amount of force on the blade 244 increases by at least 2×, 5×, 10×, 20×, 50×, 100×, or more compared to baseline when a cured element 240 contacts the blade 244. Conversely, if the force on the blade 244 remains relatively low (e.g., below the threshold), this may indicate that the system 200 is operating normally, with no cured elements 240 at the post-print zone 236. Alternatively or in combination, other types of sensors 302 can also be used. For example, in some instances, the force applied by the cured element 240 can displace the blade 244, thus causing the position and/or angle A to change. In such embodiments, the sensor 302 can be or include a position sensor, angle sensor, or other suitable sensor configured to detect the presence of the cured element 240 based on the displacement of the blade 244 over time.

Figure 4A:
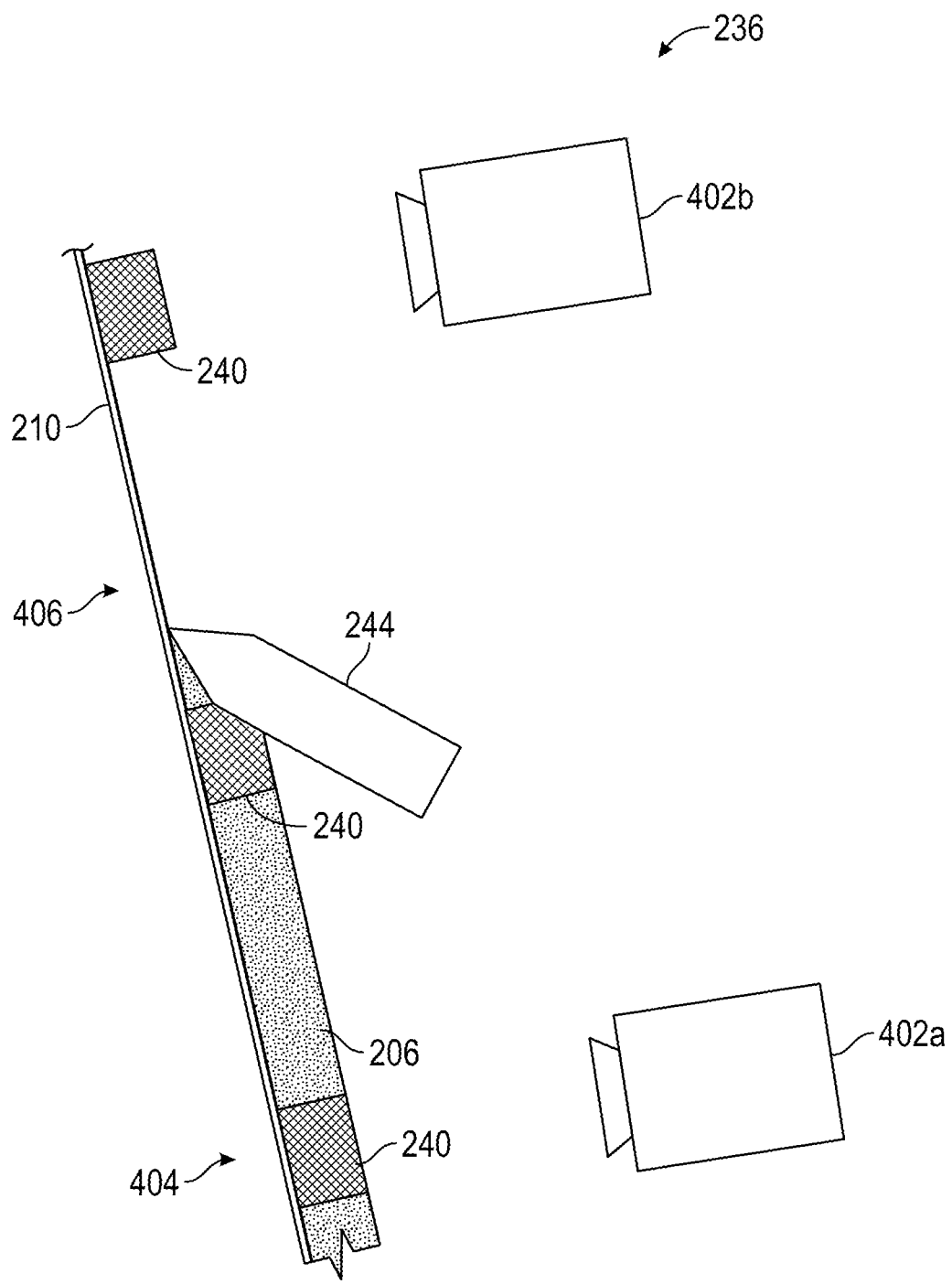
FIG. 4A is a closeup side view of the blade of FIG. 2 together with one or more imaging devices, in accordance with embodiments of the present technology.

FIG. 4A is a closeup side view of the blade 244 of the system 200 together with one or more imaging devices 402a, 402b (collectively, "imaging devices 402"), in accordance with embodiments of the present technology. The imaging devices 402 can be cameras, scanners, or any other device configured to generate 2D or 3D image data of the material on the carrier film 210 within the post-print zone 236. In the illustrated embodiment, the post-print zone 236 includes two imaging devices 402: a first imaging device 402a positioned upstream of the blade 244, and a second imaging device 402b positioned downstream of the blade 244. In other embodiments, however, the number and/or arrangement of imaging devices 402 can be varied, e.g., a different number of imaging devices 402 can be used (e.g., one, three, four, five, or more imaging devices 402), the first and/or second imaging devices 402a, 402b can be positioned at different locations relative to the blade 244, etc.

As shown in FIG. 4A, the first imaging device 402a can be configured to generate image data of a first section 404 of the carrier film 210 before the blade 244 ("first image data"). The first image data can be used to determine whether the material entering the post-print zone 236 contains any cured elements 240. For example, the controller 234 (FIG. 2) can analyze the first image data using computer vision techniques, machine learning algorithms, and/or other suitable approaches to identify any cured elements 240 that are present in the first section 404, and, optionally, to determine the number, size, shape, location, and/or other characteristics of the cured elements 240. Subsequently, the controller 234 can take steps to mitigate the printing defect, such as by adjusting one or more print parameters for forming subsequent object layers as described above. In other embodiments, the first imaging device 402a is optional and can be omitted.

The second imaging device 402b can be configured to generate image data of a second section 406 of the carrier film 210 after the blade 244 ("second image data"). The second image data can be used to determine whether the blade 244 has successfully removed the cured elements 240 from the carrier film 210. For example, the controller 234 can analyze the second image data using computer vision techniques, machine learning algorithms, and/or other suitable approaches to identify any cured elements 240 that are present in the second section 406, and, optionally, to determine the number, size, shape, location, and/or other characteristics of the cured elements 240. If any cured elements 240 are detected in the second image data, the controller 234

(FIG. 2) can transmit instructions to cause the system 200 to reclean the carrier film 210 (e.g., by recirculating the carrier film 210 past the blade 244), and/or send an alert to an operator to manually clean the carrier film 210 and/or replace the blade 244, as described above. In other embodiments, the second imaging device 402b is optional and can be omitted.

Optionally, the image data from the imaging devices 402 can be used to control other aspects of the operation of the system 200. For example, in some embodiments, when the controller 234 detects a cured element 240 entering the post-print zone 236 (e.g., based on the first image data from the first imaging device 402a), the controller 234 can initiate one or more cleaning processes configured to enhance removal of cured elements 240 from the carrier film 210, such as vibrating the blade 244 and/or carrier film 210 (e.g., via electrical signals, acoustic waves), applying compressed air to blow the cured elements 240 off the carrier film 210, heating the material on the carrier film 210 to increase flowability, slowing the movement speed of the carrier film 210, etc. Once the controller 234 determines that the carrier film 210 is sufficiently cleaned (e.g., as detected from the second image data from the second imaging device 402b), the controller 234 can terminate the cleaning processes and revert to normal operation.

As another example, in some embodiments, the blade 244 is initially in an inactive configuration, such as a raised position away from the carrier film 210. When the controller 234 detects a cured element 240 entering the post-print zone 236, the controller 234 can instruct the system 200 to move the blade 244 into an active configuration for clearing the cured element 240 from the carrier film 210, such as a lowered position in contact with or near the carrier film 210. Once the cured element 240 has been removed, the controller 234 can instruct the system 200 to move the blade 244 back into the inactive configuration.

In a further example, the blade 244 can be one of a plurality of blades 244 mounted on a cassette. The blades 244 can have different characteristics, such as different sizes, shapes, materials, etc. When the controller 234 detects a cured element 240 entering the post-print zone 236, the controller 234 can select an appropriate blade 244 for clearing the cured element 240, based on the number, size, shape, location, and/or other characteristics of the cured element 240. The controller 234 can then instruct the system 200 to actuate the cassette so that the selected blade 244 is positioned in contact with or near the carrier film 210.

Figure 4B:
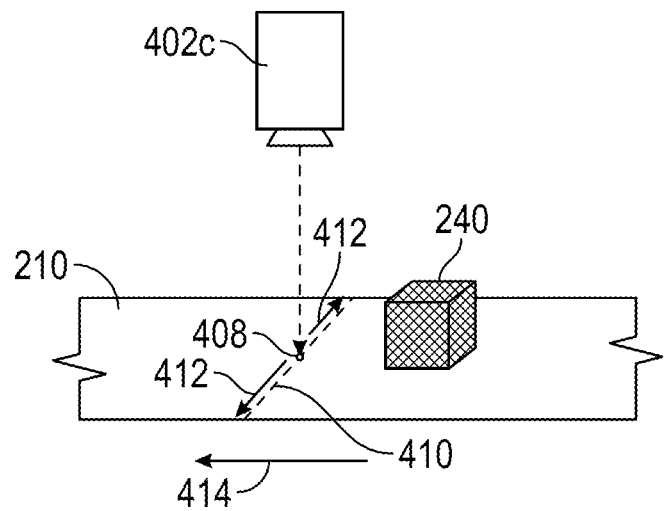
FIGS. 4B-4D are perspective views illustrating various types of imaging devices configured in accordance with embodiments of the present technology.
Figure 4C:
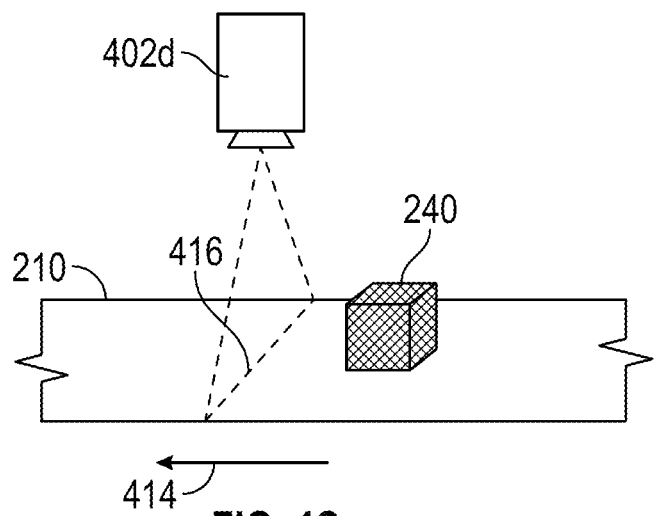
Figure 4D:
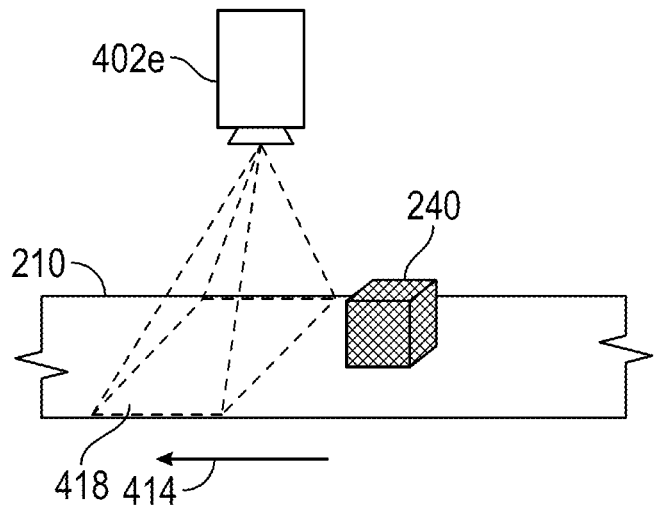

FIGS. 4B-4D are perspective views illustrating various types of imaging devices 402c-402e configured in accordance with embodiments of the present technology. The imaging devices 402c-402e can be used to detect cured elements 240 on the carrier film 210 (the curable material on the carrier film 210 is omitted in FIGS. 4B-4D merely for purposes of simplicity). Any of the imaging devices 402c-402e can be used as the first imaging device 402a and/or the second imaging device 402b of FIG. 4A.

Referring first to FIG. 4B, the imaging device 402c can be a spot camera, point scanner, or similar device that is configured to image a discrete spot 408 (e.g., a point or small region) on the carrier film 210. During operation, the imaging device 402c can scan the spot 408 along an imaging path 410 (e.g., in the directions indicated by arrows 412) to generate one or more images at each spot 408. In the illustrated embodiment, for example, the imaging path 410 is a linear trajectory spanning the width of the carrier film 210 that is substantially orthogonal to the direction of movement of the carrier film 210 (e.g., as indicated by arrow 414). Alternatively, the spot 408 can be maintained at a stationary position and orientation relative to the imaging device 402c, and the imaging device 402c itself can be moved along a trajectory parallel to the imaging path 410 to generate images along the imaging path 410. Subsequently, the imaging device 402c (or another component coupled to the imaging device 402c, such as the controller 234 of FIG. 2) can stitch together the image(s) obtained at each spot 408 along the imaging path 410 to build up 2D image data of the material on the carrier film 210.

Referring next to FIG. 4C, the imaging device 402d can be a line camera, line scanner, or similar device that is configured to generate image data along a line 416 on the carrier film 210. As shown in FIG. 4C, the imaging device 402d can be arranged such that the line 416 extends along the width of the carrier film 210 and is substantially orthogonal to the direction of movement of the carrier film 210 (e.g., as indicated by arrow 414). Accordingly, as the carrier film 210 is advanced, the image(s) obtained along the line 416 at each time point can be stitched together to produce 2D image data of the material on the carrier film 210. Optionally, the carrier film 210 can remain stationary, and the line 416 and/or imaging device 402c can be moved along the length of the carrier film 210 to generate the image data.

Referring next to FIG. 4D, the imaging device 402e can be a 2D camera, 2D scanner, or similar device that is configured to generate 2D images of a region 418 on the carrier film 210. Optionally, multiple 2D images captured over time can be combined to produce video data of the material on the carrier film 210. The image data can then be analyzed to detect the presence of any cured elements 240 on the carrier film 210, as discussed above.

Referring again to FIG. 2, the system 200 can optionally use other types of sensors to detect the presence of cured elements 240, in addition or alternatively to the embodiments of FIGS. 3A-4D. For example, the sensor(s) 242 of the system 200 can include at least one distance sensor, such as an ultrasonic rangefinder, laser rangefinder, time-of-flight sensor, etc. The distance sensor can be mounted above the surface of the carrier film 210 to measure the height of the material on the carrier film 210. Significant changes in the height of the material (e.g., a sudden increase in the height relative to baseline) can indicate the presence of cured elements 240 on the carrier film 210.

As another example, the sensor(s) 242 of the system 200 can include at least one optical sensor (e.g., a refractometer or spectrophotometer) that is configured to measure an optical property of the material on the carrier film 210, such as absorbance, transmittance, reflectivity, refractive index, etc. In some embodiments, the optical properties of the curable material 206 change after curing, e.g., certain types of polymeric resins become more opaque when cured. Accordingly, the sensor data produced by the optical sensor can be analyzed to identify changes in one or more optical properties that indicate the presence of cured elements 240 on the carrier film 210.

In a further example, the sensor(s) 242 of the system 200 can include at least one sensor configured to detect the response of the material on the carrier film 210 to mechanical perturbations (e.g., vibrations). A plurality of transducers (e.g., piezoelectric transducers, ultrasonic transducers) can be arranged along the width of the carrier film 210 at the post-print zone 236 to apply vibrations to the carrier film 210 and the material thereon, and to measure the response of the carrier film 210 and material to the vibrations. In some embodiments, the localized response varies depending on whether any cured elements 240 are present, e.g., the resonant frequency at or near the cured element 240 may increase due to the higher stiffness of the cured element 240 compared to the curable material 206. Accordingly, the response measured by each transducer can be used to determine whether any cured elements 240 are present on the carrier film 210 at or near that transducer.

Figure 5:
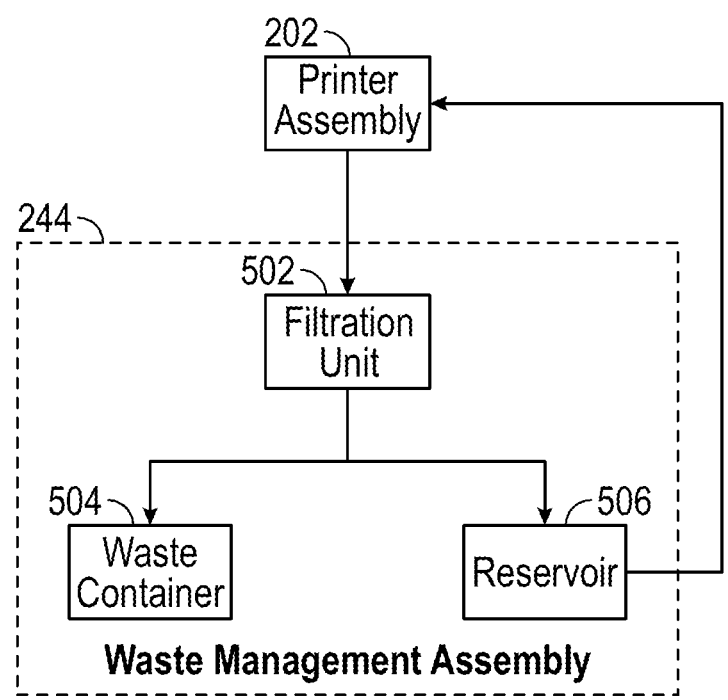
FIG. 5 is a schematic block diagram of a waste management assembly of the system of FIG. 2, in accordance with embodiments of the present technology.

FIG. 5 is a schematic block diagram of the waste management assembly 246 of the system 200 of FIG. 2, in accordance with embodiments of the present technology. As shown in FIG. 5, the waste management assembly 246 is connected to the printer assembly 202 to receive and process material from the printer assembly 202, such as curable material 206, cured elements 240, and/or other material exiting the print zone 224 of the printer assembly 202. The material from the printer assembly 202 can be separated from the carrier film 210 and diverted into the waste management assembly 246 in many different ways. For example, material scraped from the carrier film 210 by the blade 244 can be directed into pipes or channels that flow into the waste management assembly 246. As another example, in embodiments where the carrier film 210 is in a vertical or substantially vertical orientation at the post-print zone 236, material removed from the carrier film 210 by the blade 244 can flow or fall by gravity into a capture tray or other collection device that is connected to the waste management assembly 246. Optionally, the printer assembly 202 can include air nozzles, pumps, vibrating blades, or other devices that apply forces to the material to direct it into the waste management assembly 246.

As shown in FIG. 5, material entering the waste management assembly 246 can be initially processed by a filtration unit 502. The filtration unit 502 can include one or more passive or active filters that separate undesirable components (e.g., cured elements 240, contaminants, debris) from the curable material 206. The undesirable components can be diverted into a waste container 504 for disposal, while the filtered curable material 206 can be collected in a reservoir 506 for storage and/or reuse in subsequent additive manufacturing processes. For example, the reservoir 506 can be connected to the printer assembly 202 so the curable material 206 can be directed back into the printer assembly 202 for immediate reuse. In such embodiments, the waste management assembly 246 can include pipes, channels, pumps, etc., that connect the reservoir 506 to the material source 216 of the printer assembly 202. This approach can reduce material wastage and improve the efficiency of the system 200.

Figure 6:
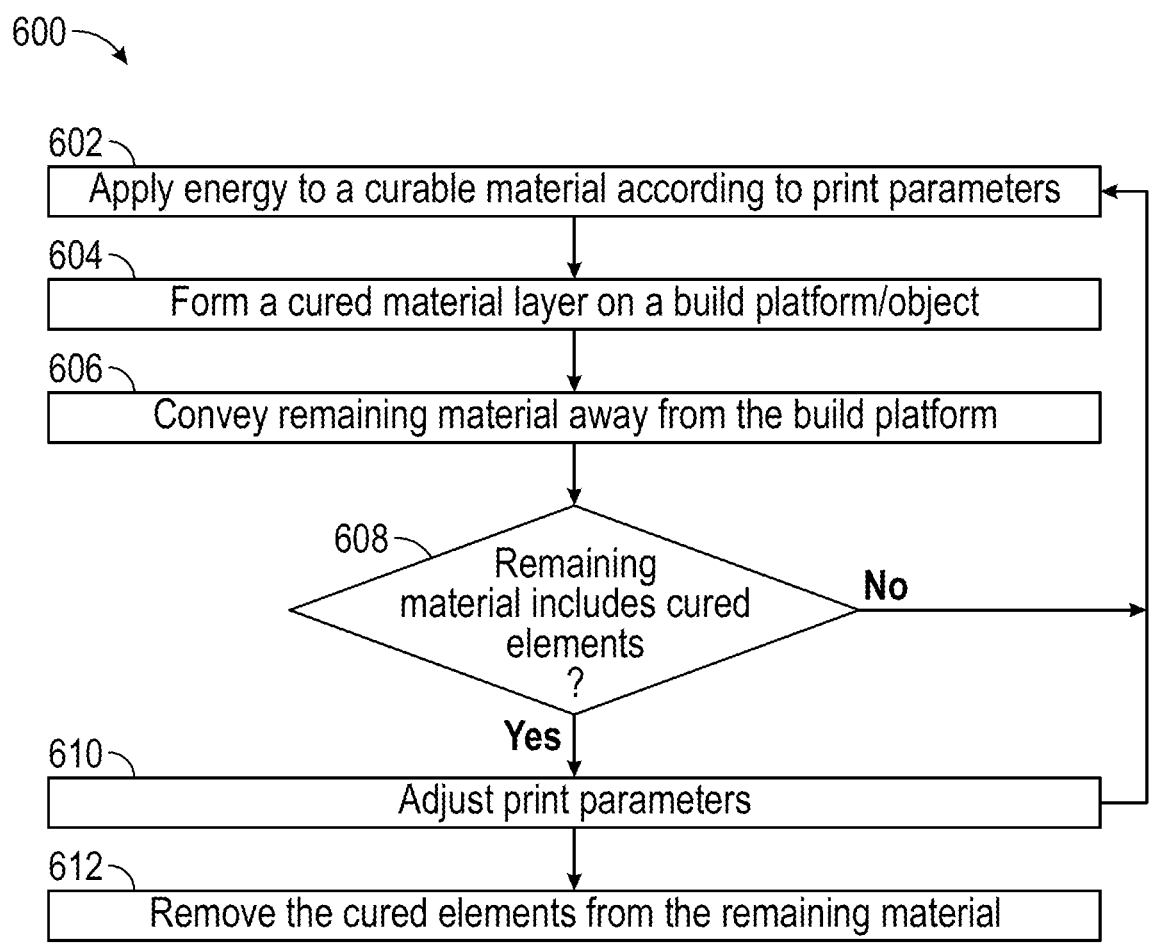
FIG. 6 is a flow diagram illustrating a method for producing an additively manufactured object, in accordance with embodiments of the present technology.

FIG. 6 is a flow diagram illustrating a method 600 for producing an additively manufactured object, in accordance with embodiments of the present technology. The method 600 can be performed by any embodiment of the systems and devices described herein, such as the system 200 of FIG. 2. In some embodiment, some or all of the steps of the method 600 are implemented as computer-readable instructions (e.g., program code) that are configured to be executed by one or more processors of a computing device, such as the controller 234 of FIG. 2.

The method 600 begins at block 602 with applying energy to a curable material according to a set of print parameters. As described above, the curable material can be a polymeric resin or other solidifiable precursor that is provided as a thin, uniform layer on a film (e.g., the carrier film 210 of FIG. 2). The energy can be light energy (e.g., UV light), heat energy, or any other type of energy suitable for partially or completely curing the curable material from a liquid or semi-liquid state into a solid state. The energy can be produced by an energy source (e.g., the energy source 226 of FIG. 2) that scans or projects the energy in a desired pattern based on a digital model of the object to be printed. The print parameters for applying the energy can include any of the parameters discussed above, such as the exposure time, power density (e.g., laser power density (LPD)), energy density, material temperature, etc.

At block 604, the method 600 can continue with forming a cured material layer on a build platform (if forming the initial layer of the object) or on an object on the build platform (if forming a subsequent layer of the object). As previously discussed, the application of energy to the curable material in block 602 can cause the curable material to solidify and adhere to the underlying build platform or object surface.

At block 606, the method 600 can include conveying remaining material away from the build platform. The remaining material can include any curable material that was not formed into the object layer during the processes of blocks 602 and 604. As described above, the process of block 606 can include moving the curable material away from the build platform so the cured material layer lifts off from the carrier film, while the curable material remains attached to the carrier film 210.

At block 608, the method 600 can include determining whether the remaining material conveyed away from the build platform includes any cured elements, such as a portion or the entirety of the cured material layer formed in block 608. As previously discussed, cured elements may be present in the remaining material if the cured material layer delaminates from the build platform or object surface due to poor adhesion and/or insufficient cure depth. The presence of cured elements in the remaining material can be detected using sensor data from any of the sensor types described herein. For example, the process of block 608 can include measuring an amount of force applied to a blade configured to clean the remaining material from the carrier film, and analyzing the measured force to detect changes indicating that a cured element has contacted the blade. As another example, the process of block 608 can include generating image data of the remaining material using at least one imaging device, and analyzing the image data to detect the presence of cured elements in the remaining material.

If no cured elements are detected, the method 600 can return to block 602 to form the next object layer using the original print parameters. If cured elements are detected, the method 600 can proceed to block 610 to adjust one or more of the print parameters to improve adhesion of cured material to the build platform and/or object. For example, improved adhesion may be achieved by increasing the cure depth produced by the energy applied to the curable material. The adjustments can include, but are not limited to, any of the following: increasing the exposure time, power density, and/or energy density of the energy applied to the curable material; increasing a temperature of the curable material; or suitable combinations thereof. The type and magnitude of the adjustment can be determined based on preset instructions, using machine learning algorithms, and/or other suitable techniques, as described above.

Subsequently, the method 600 can return to block 602 to apply energy to the curable material to form another cured material layer on the object or build platform, using the adjusted print parameters. If most or all of the previous cured material layer had delaminated (e.g., more than 50%, 60%, 70%, 80%, or 90% of the total surface area of the previous layer), block 602 can involve reprinting the previous layer with the adjusted print parameters. If only a small portion of the previous layer had delaminated (e.g., less than 50%, 40%, 30%, 20%, or 10% of the total surface area of the previous layer), block 602 can instead involve printing the next layer of the object with the adjusted print parameters. The processes of blocks 604-608 can then be repeated to determine whether the newly formed layer has adhered properly, or whether further adjustments are needed.

At block 612, the method 600 can optionally include removing the cured elements from the remaining material. As previously described, the process of block 612 can include contacting the remaining material with one or more blades (e.g., the blade 244 of FIG. 2) to scrape the material off the carrier film and into a waste management assembly (e.g., the waste management assembly 246 of FIGS. 2 and 5). The cured elements can then be separated from the remaining curable material via filtration, and the remaining curable material can be reused to form additional object layers.

Figure 7:
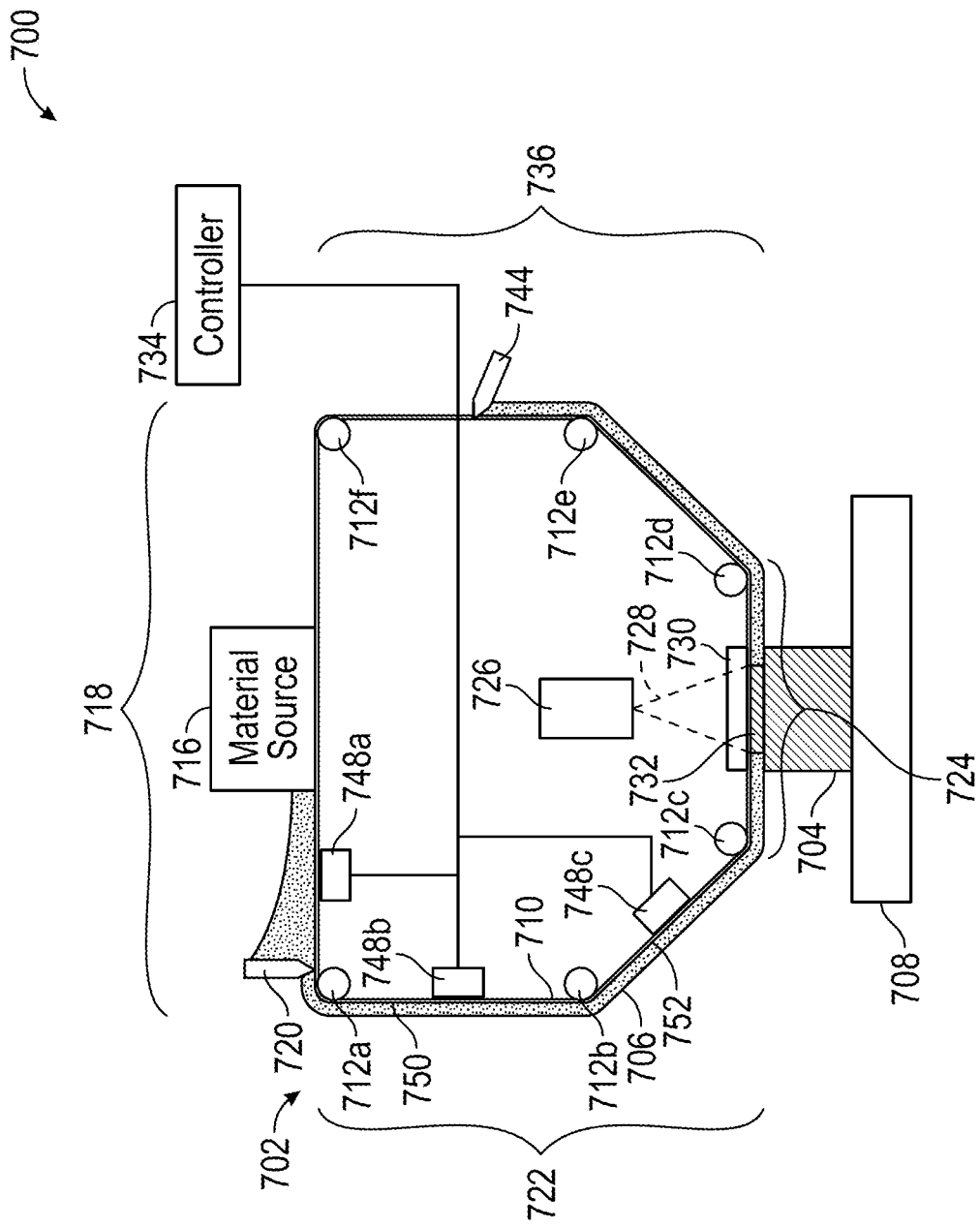
FIG. 7 is a partially schematic diagram of a system for additive manufacturing configured in accordance with embodiments of the present technology.

FIG. 7 is a partially schematic diagram of a system 700 for additive manufacturing configured in accordance with embodiments of the present technology. The system 700 can be generally similar to the system 200. Accordingly, like numbers (e.g., carrier film 710 versus carrier film 210) are used to identify similar or identical components, and the description of the system 700 will be limited to those features that differ from the system 200 illustrated in FIG. 2. Additionally, any of the features of the system 200 of FIG. 2 can be incorporated into the system 700 of FIG. 7, and vice-versa.

The system 700 is configured to monitor the temperature of a curable material 706 used to form an additively manufactured object 704 ("object 704"). Accurate control over the temperature of the curable material 706 can be important, for example, if the curable material 706 includes one or more volatile components that evaporate at excessively high temperature, which may cause undesirable changes to the composition and/or properties of the curable material 706. Additionally, the temperature of the curable material 706 can affect its viscosity, which can affect the formation of a cured polymer network when energy 728 is applied to the curable material 706. In some embodiments, if the temperature of the curable material 706 is too low during curing, this may result in poor mobility of polymerizable components (e.g., monomers) within the material and poor network formation, which may detrimentally affect the mechanical properties of the object 704 (e.g., stiffness, stress relaxation, strength).

In some embodiments, the system 700 monitors the temperature of the curable material 706 indirectly by measuring a characteristic of the curable material 706 that has a known correlation to temperature, such as viscosity. The indirect measurement technique can use noncontact sensors (e.g., sensors that do not directly contact the curable material 706), contact sensors (e.g., sensor that directly contact the curable material 706), or combinations thereof. The indirect measurement techniques described herein can provide various advantages compared to direct temperature measurements. For example, temperature probes that are placed in direct contact with the curable material 706 may become coated with the curable material 706 over time, thus resulting in loss of sensitivity and/or accuracy, and may therefore require constant cleaning and maintenance. Temperature probes that are not placed in direct contact with the curable material 706 may not provide sufficiently accurate measurements. Inaccurate temperature measurements can result in overheating and/or underheating of the curable material 706, which can affect curing, cause plastic deformation or melting of the carrier film 710, and/or other printing issues.

In some embodiments, the system 700 is configured to use vibration to measure the viscosity of the curable material 706 at one or more locations of the printer assembly 702, which can be correlated to the temperature of the curable material 706. The viscosity of the curable material 706 can be determined from the response of the curable material 706 to vibration in various ways. For instance, the viscosity can be determined by determining the amount of excitation energy to maintain a particular vibration amplitude; determining the time for the vibration amplitude to decay to zero amplitude; and/or determining the damping coefficient of the curable material 706 using a resonator and receiver.

As shown in FIG. 7, the system 700 can include one or more agitators 748a-748c (collectively, "agitators 748"—shown schematically) configured to mechanically perturb (e.g., generate vibrations within) the curable material 706. The agitators 748 can be or include any device capable of generating and sensing vibrations, such as an acoustic (e.g., ultrasonic) transducer or a piezoelectric transducer. Each agitator 748 can include a vibrating element configured to generate vibrations in the curable material 706, such as a piezoelectric transmitter or an acoustic transmitter. The agitators 748 can be configured to emit energy (e.g., ultrasonic waves) that is constant or time-variant over a duration of application. The agitators 748 can be configured to provide energy with an associated frequency, for example, by shaking, vibrating, sonicating, stirring, oscillating, and/or compressing the curable material 706. The agitators 748 can transmit energy (e.g., vibrate within or against the curable material 706) with a frequency of at least 0.5 kHz, 1 kHz, 2 kHz, 3 kHz, 4 kHz, 5 kHz, 6 kHz, 8 kHz, 10 kHz, 12 kHz, 15 kHz, 20 kHz, 25 kHz, 30 kHz, 40 kHz, 50 kHz, 75 kHz, or 100 kHz. The agitators 748 can transmit energy with a frequency of at most 100 kHz, 75 kHz, 50 kHz, 40 kHz, 30 kHz, 25 kHz, 20 kHz, 15 kHz, 10 kHz, 8 kHz, 6 kHz, 5 kHz, 4 kHz, 3 kHz, 2 kHz, 1 kHz, or 0.5 kHz. In some cases, the agitators 748 transmit energy with a frequency within a range from 5 kHz to 30 kHz.

The system 700 can include any suitable number of agitators 748, such as one, two, three, four, five, 10, 20, or more agitators 748. The agitators 748 can be positioned at any suitable location in the printer assembly 702, such as at the deposition zone 718, the pre-print zone 722, print zone 724, post-print zone 736, and/or at the material source 716. In the illustrated embodiment, for example, the system 700 includes three agitators 748: a first agitator 748a at the deposition zone 718, a second agitator 748b in the pre-print zone 722 (e.g., proximate to a vertical segment 750 of the carrier film 710 between the rollers 712a and 712b), and a third agitator 748c in the pre-print zone 222 (e.g., proximate to an angled segment 752 of the carrier film 710 between the rollers 712b and 712c). Alternatively, one or more of the agitators 748a-748c can be omitted and/or the system 700 can include one or more agitators 748 at different locations (e.g., the print zone 724 and/or post-print zone 736). Any of the zones of the printer assembly 702 can include a single agitator 748 or a plurality of agitators 748.

The agitators 748 can be positioned in direct contact with the curable material 706 (e.g., partially or completely immersed in the curable material 706), or can be spaced apart from the curable material 706. For example, some or all of the agitators 748 can be positioned against the surface of the carrier film 710 opposite the surface carrying the curable material 706. In such embodiments, the agitators 748 can vibrate a section of the carrier film 710, and the vibrations can be transmitted by the carrier film 710 to the curable material 706 on that section of the carrier film 710.

Optionally, a plurality of agitators 748 can be spatially distributed in a line along the length of the carrier film 710, in a line across the width of the carrier film 710, as a 2D array over an area of the carrier film 710, or any other suitable configuration.

In some embodiments, some or all of the agitators 748 are placed at or near locations where heating of the curable material 706 occurs. For example, the system 700 can include one or more heat sources (e.g., heating plates, infrared lamps, etc. —not shown) for heating the curable material 706 at the deposition zone 718, pre-print zone 722 (e.g., at the vertical segment 750 and/or the angled segment 752), print zone 724, and/or post-print zone 736. The heat sources can be positioned near or in direct contact with the carrier film 710 to heat the curable material 706 supported by the carrier film 710. The heat sources can be positioned at or proximate to the surface of the carrier film 710 carrying the curable material 706, at or proximate to the opposite surface of the carrier film 710, or suitable combinations thereof. In some embodiments, each heat source applies heat to a particular heating zone, and any of the agitators 748 can apply vibrations to the curable material 706 upstream of the heating zone (e.g., to monitor the curable material 706 before heating), downstream of the heating zone (e.g., to monitor the curable material 706 after heating), and/or at the heating zone (e.g., to monitor the curable material 706 during heating).

The system 700 also include one or more sensors configured to measure the response of the curable material 706 (e.g., displacement amplitude and/or frequency over time) to the vibrations applied by the agitators 748. In some embodiments, for example, each agitator 748 also includes a receiver configured to measure the response, such as a piezoelectric receiver or an acoustic (e.g., ultrasonic) receiver. Alternatively or in combination, the response can be measured using a separate sensor (not shown), such as an imaging device (e.g., a camera), displacement sensor, distance sensor, force sensor, strain sensor, and/or position sensor. In such embodiments, the sensor(s) can be positioned at or near the corresponding agitator 748 (e.g., at the deposition zone 718, pre-print zone 722, print zone 724, and/or post-print zone 736).

In some embodiments, each agitator 748 applies vibrations to the carrier film 710 and curable material 706 thereon, and the response of the carrier film 710 and curable material 706 to the vibrations is measured. The response can be modeled as a damped sinusoidal function having an amplitude that decays over time. The parameters of the response (e.g., decay time, decay rate, damping ratio, stiffness coefficients) can be determined using known characteristics of the carrier film 710 (e.g., mass, length, stiffness) and the curable material 706 (e.g., mass). In some embodiments, the response is modeled by the forced vibration equation $m\ddot{x}+c\dot{x}+kx=f(t)$, where m is the mass of the vibrating element (e.g., combined mass of the carrier film 710 and curable material 706), c is the damping coefficient (e.g., combined damping coefficient of the carrier film 710 and curable material 706), k is the stiffness of the vibrating element (e.g., combined stiffness of the carrier film 710 and curable material 706), and f(t) is the forcing function (e.g., vibration signal applied by the agitator 748). The value of c can be computed based on the measured decay amplitude and/or time, and can be used to determine the viscosity of the curable material 706. The viscosity of the curable material 706 can then be used to determine the temperature of the curable material 706, using characteristic rheological trends of the curable material 706 (e.g., relationship between temperature and viscosity of the curable material 706).

Optionally, viscosity and/or temperature values determined at one location in the printer assembly 702 can be used to estimate the viscosity and/or temperature of the curable material 706 at a different location in the printer assembly 702. For example, the movement speed of the curable material 706 through the printer assembly 702 (e.g., the movement speed of the carrier film 710), exposed surface area of the curable material 706, radiant heat transfer coefficient of the curable material 706, and/or convective heat transfer coefficient of the curable material 706 can be used to calculate the difference in temperature of the curable material 706 from a first location in the printer assembly (e.g., the deposition zone 718 or pre-print zone 722) to a second location in the printer assembly (e.g., the print zone 724).

As another example, the viscosity and/or temperature of the curable material 706 can be measured from a sample of the curable material 706 that is separate from the main trajectory of the curable material 706 through the printer assembly 702, such as a small amount of the curable material 706 diverted into a reservoir or other collection device (not shown). This approach can advantageously avoid disturbances to the printing process while still providing accurate measurements. In such embodiments, the system 700 can include an agitator 748 at or within the reservoir to apply vibrations to the curable material 706 within the reservoir. The response of the curable material 706 can be measured using the agitator 748 and/or a separate sensor, and can be used to determine the viscosity and/or temperature of the curable material 706 within the reservoir, as described above. The viscosity and/or temperature of the curable material 706 can be used to estimate the viscosity and/or temperature the curable material 706 at another location in the printer assembly 702 (e.g., the deposition zone 718, pre-print zone 722, and/or print zone 724). In some embodiments, if the reservoir is sufficiently close to the corresponding location, the viscosity and/or temperature of the curable material 706 can be assumed to be the same as the viscosity and/or temperature of the curable material 706 at the corresponding location.

Alternatively or in combination, the system 700 can use a pressure-based technique to indirectly determine the viscosity (and thus, temperature) of the curable material 706. In such embodiments, the system 700 can include one or more flow restrictors that create a partial blockage in the flow of the curable material 706, such as a blade (e.g., the blade 720, blade 744, or another blade). The flow restrictor can be placed at any location in the printer that does not interfere with the printing process. For instance, one or more flow restrictors can be placed at the deposition zone 718, pre-print zone 722, print zone 724, and/or post-print zone 736. The resistance to flow produced by the flow restrictor can cause a pressure differential at different sides of the flow restrictor (e.g., the upstream side versus the downstream side), and the pressure differential can be used to compute the dynamic viscosity of the curable material 706 at and/or near the flow restrictor.

Figure 8:
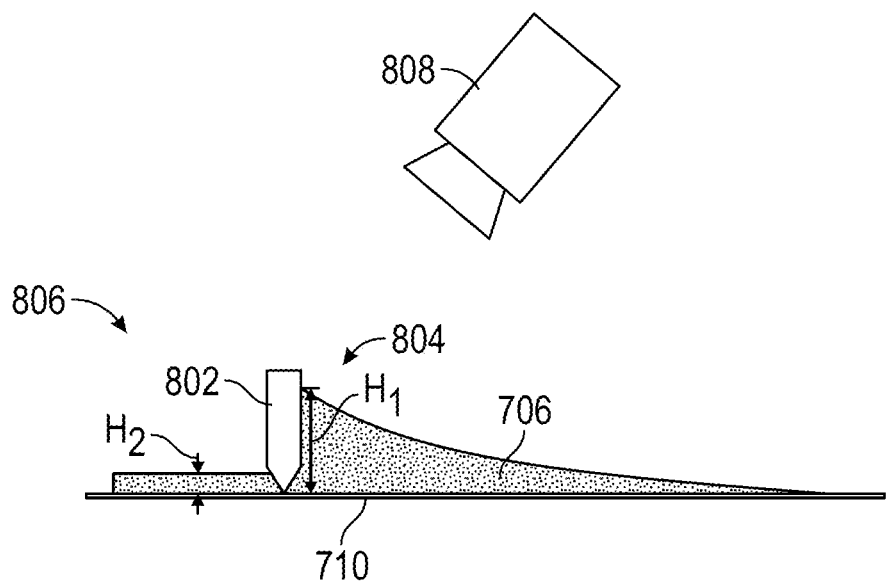
FIG. 8 is a partially schematic side view of a flow restrictor that may be used in the system of FIG. 7, in accordance with embodiments of the present technology.

FIG. 8 is a partially schematic side view of a flow restrictor 802 that may be used in the system 700 of FIG. 7, in accordance with embodiments of the present technology. The flow restrictor 802 can be configured as a blade (e.g., a doctor blade, recoater blade) that is configured to be positioned proximate to the surface of the carrier film 710 of the system 700 and in contact with the curable material 706 on the carrier film 710. Although FIG. 8 depicts the flow restrictor 802 as being positioned in contact with the outer surface of the carrier film 710, in other embodiments, the flow restrictor 802 can be spaced apart from the outer surface of the carrier film 710, such as by a height of at least 1 mm, 900 μm, 800 μm, 700 μm, 600 μm, 500 μm, 400 μm, 300 μm, 200 μm, 100 μm, 75 μm, 50 μm, 25 μm, or 10 μm. The angle of the flow restrictor 802 (e.g., as measured from the outer surface of the carrier film 710 upstream of the flow restrictor 802) can be less than or equal to 90°, 80°, 70°, 60°, 50°, 45°, 40°, 35°, 30°, 25°, 20°, 15°, or 10°. In some embodiments, the flow restrictor 802 is a fixed element that is maintained at a stationary position and angle during operation. In other embodiments, however, the flow restrictor 802 can be a movable element such that the position and/or angle are adjustable.

The flow restrictor 802 can partially occlude flow of the curable material 706, thus causing curable material 706 to pool behind the flow restrictor 802 and creating a pressure differential in the curable material 706 on the upstream side 804 versus the downstream side 806 of the flow restrictor 802. The pressure differential can cause the curable material 706 to have different heights at the upstream side 804 versus the downstream side 806. In the illustrated embodiment, the curable material 706 has a first height $H_1$ at the upstream side 804, and a second, lower height $H_2$ at the downstream side 806. Using the Couette flow equation, an analytical solution for the dynamic viscosity of the curable material 706 can be determined. For instance, the relative change in viscosity can be determined using the equation $\mu \propto (H_1-H_2) \rho$, where $\mu$ is the dynamic viscosity and $\rho$ is the density of the curable material 706. The viscosity can then be used to determine the temperature of the curable material 706, using characteristic rheological trends of the curable material 706 (e.g., relationship between temperature and viscosity of the curable material 706).

The heights of the curable material 706 at the upstream side 804 and downstream side 806 of the flow restrictor 802 can be determined in various ways. In the illustrated embodiment, an imaging device 808 (e.g., a camera) is used to generate image data that can be analyzed to measure the heights $H_1$, $H_2$. Alternatively or in combination, other types of sensors can be used, such as displacement sensors (e.g., linear variable differential transformers), distance sensors, strain sensors, force sensors, pressure sensors, interferometers, etc.

Optionally, the viscosity of the curable material 706 at the flow restrictor 802 can be measured using a force sensor configured to measure an amount of force applied to the flow restrictor 802 by the curable material 706. Changes in the amount of force over time may correlate to changes in viscosity and/or temperature of the curable material 706. In some embodiments, changes in the force on the flow restrictor 802 can cause the position and/or angle of the flow restrictor 802 to change, and can thus be detected using a position sensor, angle sensor, or other suitable sensor configured to monitor the displacement of the flow restrictor 802 over time.

Referring again to FIG. 7, the controller 734 can be configured to control the operation of the printer assembly 702 based on the viscosity and/or temperature measurements. For example, the controller 734 can control the operation of the agitators 748 to apply vibrations to the curable material 706 at one or more locations of the printer assembly 702. The response data received from the agitators 748 and/or other sensors can be transmitted back to the controller 734, and the controller 734 can use the response data to determine the viscosity and/or temperature of the curable material 706 at the corresponding locations of the printer assembly 702. Alternatively or in combination, the controller 734 can monitor the height of the curable material 706 at one or more flow restrictors (e.g., the flow restrictor 802 of FIG. 8) using sensor data from one or more sensors (e.g., the imaging device 808 of FIG. 8), and can use the sensor data to determine the viscosity and/or temperature of the curable material 706 at the flow restrictor(s). The viscosity and/or temperature can be measured at predetermined time intervals (e.g., once every x seconds or minutes) or continuously.

Based on the temperature and/or viscosity of the curable material 706, the controller 734 can assess whether any adjustments to the operations of the printer assembly 702 should be made. For example, the controller 734 can compare the measured temperature and/or viscosity to target values and/or ranges (e.g., values and/or ranges that have been determined to be optimal for performing additive manufacturing). If the temperature and/or viscosity lies outside the target value and/or range, the controller 734 can take appropriate actions, such as changing the operational parameters of one or more heat sources (e.g., heat output, heating time, heating direction), changing the operational parameters of the energy source 726 (e.g., exposure time, exposure pattern, exposure wavelength, energy density, power density), adjusting the movement speed of the carrier film 710, pausing the print, or canceling the print.

The configuration of the system 700 can provide numerous advantages. For instance, the real-time monitoring and closed loop control of temperature and/or viscosity allows for tighter process control, in-situ quality checks, and/or grayscaling (e.g., via mediating the reaction kinetics through temperature and viscosity). The techniques for measuring temperature and/or viscosity described herein can be more robust, accurate, and chemically resistant compared to conventional approaches such as direct temperature measurements. Additionally, some or all of the components used for monitoring temperature and/or viscosity can be preexisting parts of the printer assembly 702 (e.g., carrier film 710, blade 720), thus reducing the number of new components to be added to the system 700 to provide the functionalities described herein.

Figure 9:
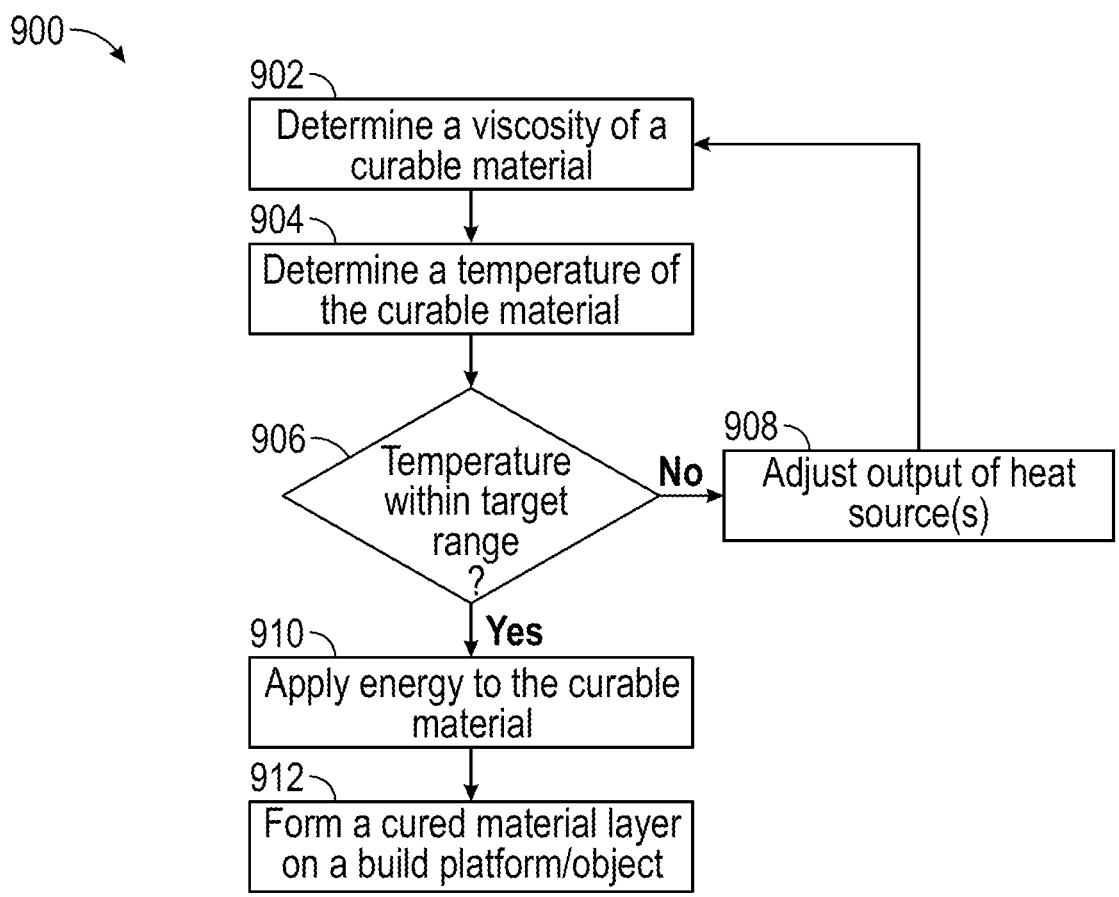
FIG. 9 is a flow diagram illustrating a method for producing an additively manufactured object, in accordance with embodiments of the present technology.

FIG. 9 is a flow diagram illustrating a method 900 for producing an additively manufactured object, in accordance with embodiments of the present technology. The method 900 can be performed by any embodiment of the systems and devices described herein, such as the system 700 of FIG. 7. In some embodiment, some or all of the steps of the method 900 are implemented as computer-readable instructions (e.g., program code) that are configured to be executed by one or more processors of a computing device, such as the controller 734 of FIG. 7. The method 900 can be combined with any of the other methods described herein, such as the method 600 of FIG. 6.

The method 900 begins at block 902 with determining a viscosity of a curable material. As described above, the curable material can be a polymeric resin or other solidifiable precursor that is provided as a thin, uniform layer on a film (e.g., the carrier film 710 of FIG. 7). The viscosity of the curable material can be determined before the material is used in an additive manufacturing process to fabricate an object, such as before energy is applied to the curable material to solidify the curable material into a layer of the object. The viscosity can be measured when the curable material is at a location where the energy will be applied (e.g., at the print zone 724 of FIG. 7) and/or before the curable material is transported to the location where the energy will be applied (e.g., at the deposition zone 718 and/or the pre-print zone 722 of FIG. 7).

The viscosity can be determined in many different ways. For example, the viscosity can be determined by applying a mechanical perturbation to the curable material (and/or to another component in contact with the curable material, such as a carrier film), and determining the response of the curable material (and/or the other component) to the applied perturbation. As described elsewhere herein, the mechanical perturbation can include vibrations applied to the curable material via an agitator (e.g., the agitator 748 of FIG. 7), and the movement of the curable material over time can be measured (e.g., using a receiver of the agitator 748 of FIG. 7 and/or a separate sensor) and used to determine the viscosity of the curable material. As another example, the viscosity can be determined by applying a flow restriction to the curable material (e.g., via the flow restrictor 802 of FIG. 8), and determining the pressure differential resulting from the flow restriction. In some embodiments, the pressure differential is determined by measuring the height of the curable material at different sides of the flow restriction (e.g., using the imaging device 808 of FIG. 8 and/or another sensor type). The pressure differential (and/or the corresponding height differential) can be used to calculate the viscosity of the curable material.

At block 904, the method 900 can include determining a temperature of the curable material, based on the viscosity. The relationship between temperature and viscosity of the curable material can be known (e.g., via experimental data, scientific literature, modeling), and can be stored in a lookup table or other data structure, modeled using a function, or provided in any other suitable format. The temperature can be determined for a single location (e.g., the deposition zone 718 only, the pre-print zone 722 only, the print zone 724 only, or the post-print zone 736 only), or can be determined for a plurality of different locations (e.g., the deposition zone 718 and the pre-print zone 722, the deposition zone 718 and the print zone 724, the pre-print zone 722 and the print zone 724). Optionally, temperature measurements at one location can be used to estimate the temperature at a different location, as described elsewhere herein.

At block 906, the method 900 can including determining whether the temperature is within a target range. The target range can encompass a plurality of temperature values that are determined or expected to be effective for additive manufacturing (e.g., provide the proper reaction kinetics and/or chemistry, result in desired mechanical properties), and/or are determined or expected to avoid printing issues (e.g., evaporation of volatile compounds, poor network formation, damage to the carrier film). In some embodiments, the target range is within 1° C., 5° C., 10° C., 15° C., or 20° C. of a target temperature value. The target temperature value can be 30° C., 40° C., 50° C., 60° C., 70° C., 80° C., 90° C., 100° C., 110° C., or 120° C.

Optionally, the process of block 906 include determining whether the temperature of the curable material is within a target range for a plurality of different locations (e.g., the deposition zone 718, the pre-print zone 722, the print zone 724, and/or the post-print zone 736). The target range for some or all of the locations can be the same (e.g., to ensure that the curable material remains at a consistent temperature), or the target range for some or all of the locations can be different (e.g., lower temperatures at the deposition zone 718 can be beneficial to avoid evaporation of volatile diluents (e.g., isopropanol) to maintain flowability, while evaporation of the diluents can be acceptable or even beneficial at the print zone 724).

If the temperature is not within the target range, the method 900 can continue to block 908 with adjusting the output of one or more heat sources. The heat sources can be heating plates, infrared lamps, thermoelectric elements, etc., that heat the curable material at one or more locations (e.g., the deposition zone 718, pre-print zone 722, print zone 724, and/or post-print zone 736). The heat sources can heat the curable material via direct contact, or can heat the curable material without direct contact (e.g., via radiative and/or convective heating). The adjustment can include increasing an amount of heat produced by the heat source, decreasing an amount of heat produced by the heat source, adjusting a direction of heat produced by the heat source (e.g., by changing the orientation of the heat source), adjusting an amount of time that heat is being applied by the heat source, adjusting the number of heat sources that are applying heat, or suitable combinations thereof. In some embodiments, the adjustments are made to one or more heat sources at the same location as the temperature measurement location, while in other embodiments, adjustments can be made to one or more heat sources at a different (e.g., upstream) location than the temperature measurement location.

Optionally, the process of block 908 includes performing additional adjustments, as an alternative to or in combination with the adjustments to the heat sources. Examples of additional operational parameters that may be adjusted include, but are not limited to, exposure time, exposure pattern, exposure wavelength, energy density, power density, and movement speed of the carrier film. In some embodiments, the process of block 906 can include pausing the print or canceling the print.

After the adjustments have been made, the processes of blocks 902, 904, and 906 can optionally be repeated to check the temperature of the curable material. If the temperature is still out of the target range, additional adjustments can be made. This process can be repeated until the temperature falls within the target range. Optionally, if the adjustments are unsuccessful after a predetermined number of iterations and/or after a predetermined time period has elapsed, the print can be paused or canceled, and an alert can be transmitted to a human operator.

Once the temperature falls within the target range, the method 900 can proceed to block 910 to apply energy to the curable material, and then to block 912 to form a cured material layer on a build platform or on an object on the build platform. The processes of blocks 910 and 912 can be identical or generally similar to the processes of blocks 602 and 604 of FIG. 6.

II. Additive Manufacturing Technology

The systems, methods, and devices described herein are suitable for use with a wide variety of additive manufacturing techniques. Although some embodiments of the present technology are described herein in connection with additive manufacturing systems that use a carrier film to transport a layer of curable material, the techniques described herein can be applied to other types of additive manufacturing systems, including systems that do not include a carrier film.

Examples of additive manufacturing techniques that can be implemented by the systems, methods, and devices provided herein include, but are not limited to, the following: (1) vat photopolymerization, in which an object is constructed from a vat of liquid photopolymer resin, including techniques such as stereolithography (SLA), digital light processing (DLP), continuous liquid interface production (CLIP), two-photon induced photopolymerization (TPIP), and volumetric additive manufacturing; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer-by-layer, and direct ink writing (DIW); (5) powder bed fusion, including techniques such as direct metal laser sintering (DMLS), electron beam melting (EBM), selective heat sintering (SHS), selective laser melting (SLM), and selective laser sintering (SLS); (6) sheet lamination, including techniques such as laminated object manufacturing (LOM) and ultrasonic additive manufacturing (UAM); and (7) directed energy deposition, including techniques such as laser engineering net shaping, directed light fabrication, direct metal deposition, and 3D laser cladding. Optionally, an additive manufacturing process can use a combination of two or more additive manufacturing techniques.

For example, the additively manufactured object can be fabricated using vat photopolymerization process in which light is used to selectively cure a vat or reservoir of a curable material (e.g., a polymeric resin). Each layer of curable material can be selectively exposed to light in a single exposure (e.g., DLP) or by scanning a beam of light across the layer (e.g., SLA). Vat polymerization can be performed in a "top-down" or "bottom-up" approach, depending on the relative locations of the vat, light source, and build platform.

As another example, the additively manufactured object can be fabricated using high temperature lithography (also known as "hot lithography"). High temperature lithography can include any photopolymerization process that involves heating a photopolymerizable material (e.g., a polymeric resin). For example, high temperature lithography can involve heating the material to a temperature of at least 30° C., 40° C., 50° C., 60° C., 70° C., 80° C., 90° C., 100° C., 110° C., or 120° C. In some embodiments, the material is heated to a temperature within a range from 50° C. to 120° C., from 90° C. to 120° C., from 100° C. to 120° C., from 105° C. to 115° C., or from 105° C. to 110° C. The heating can lower the viscosity of the photopolymerizable material before and/or during curing, and/or increase reactivity of the photopolymerizable material. Accordingly, high temperature lithography can be used to fabricate objects from highly viscous and/or poorly flowable materials, which, when cured, may exhibit improved mechanical properties (e.g., stiffness, strength, stability) compared to other types of materials. For example, high temperature lithography can be used to fabricate objects from a material having a viscosity of at least 5 Pa-s, 10 Pa-s, 15 Pa-s, 20 Pa-s, 30 Pa-s, 40 Pa-s, or 50 Pa-s at 20° C. Representative examples of high-temperature lithography processes that may be incorporated in the methods herein are described in International Publication Nos. WO 2015/075094, WO 2016/078838, WO 2018/032022, WO 2020/070639, WO 2021/130657, and WO 2021/130661, the disclosures of each of which are incorporated herein by reference in their entirety.

In a further example, the additively manufactured object can be fabricated using a selective laser sintering process involving using a laser beam to selectively melt and fuse a layer of powdered material according to a desired cross-sectional shape in order to build up the object geometry. As another example, the additively manufactured object can be fabricated using a fused deposition modeling process involving melting and selectively depositing a thin filament of thermoplastic polymer in a layer-by-layer manner in order to form an object. In yet another example, the additively manufactured object can be fabricated using a material jetting process involving jetting or extruding one or more materials onto a build surface in order to form successive layers of the object geometry.

In some embodiments, the additively manufactured object is fabricated using continuous liquid interphase production (also known as "continuous liquid interphase printing") in which the object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Representative examples of continuous liquid interphase production processes that may be incorporated in the methods herein are described in U.S. Patent Publication Nos. 2015/0097315, 2015/0097316, and 2015/0102532, the disclosures of each of which are incorporated herein by reference in their entirety.

As another example, a continuous additive manufacturing method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In another example, a continuous additive manufacturing method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety. In yet another example, a continuous additive manufacturing method can utilize a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

In a further example, the additively manufactured object can be fabricated using a volumetric additive manufacturing (VAM) process in which an entire object is produced from a 3D volume of resin in a single print step, without requiring layer-by-layer build up. During a VAM process, the entire build volume is irradiated with energy, but the projection patterns are configured such that only certain voxels will accumulate a sufficient energy dosage to be cured. Representative examples of VAM processes that may be incorporated into the present technology include tomographic volumetric printing, holographic volumetric printing, multiphoton volumetric printing, and xolography. For instance, a tomographic VAM process can be performed by projecting 2D optical patterns into a rotating volume of photosensitive material at perpendicular and/or angular incidences to produce a cured 3D structure. A holographic VAM process can be performed by projecting overlapping light patterns into a stationary reservoir of photosensitive material. A xolography process can use photoswitchable photoinitiators to induce local polymerization inside a volume of photosensitive material upon linear excitation by intersecting light beams of different wavelengths. Additional details of VAM processes suitable for use with the present technology are described in U.S. Pat. No. 11,370,173, U.S. Patent Publication No. 2021/0146619, U.S. Patent Publication No. 2022/0227051, International Publication No. WO 2017/115076, International Publication No. WO 2020/245456, International Publication No. WO 2022/011456, and U.S. Provisional Patent Application No. 63/181,645, the disclosures of each of which are incorporated herein by reference in their entirety.

The additively manufactured object can be made of any suitable material or combination of materials. As discussed above, in some embodiments, the additively manufactured object is made partially or entirely out of a polymeric material, such as a curable polymeric resin. The resin can be composed of one or more monomer components that are initially in a liquid state. The resin can be in the liquid at room temperature (e.g., 20° C.) or at an elevated temperature (e.g., a temperature within a range from 50° C. to 120° C.). When exposed to energy (e.g., light), the monomer components can undergo a polymerization reaction such that the resin solidifies into the desired object geometry. Representative examples of curable polymeric resins and other materials suitable for use with the additive manufacturing techniques herein are described in International Publication Nos. WO 2019/006409, WO 2020/070639, and WO 2021/087061, the disclosures of each of which are incorporated herein by reference in their entirety.

Optionally, the additively manufactured object can be fabricated from a plurality of different materials (e.g., at least two, three, four, five, or more different materials). The materials can differ from each other with respect to composition, curing conditions (e.g., curing energy wavelength), material properties before curing (e.g., viscosity), material properties after cured (e.g., stiffness, strength, transparency), and so on. In some embodiments, the additively manufactured object is formed from multiple materials in a single manufacturing step. For instance, a multi-tip extrusion apparatus can be used to selectively dispense multiple types of materials from distinct material supply sources in order to fabricate an object from a plurality of different materials. Examples of such methods are described in U.S. Pat. Nos. 6,749,414 and 11,318,667, the disclosures of which are incorporated herein by reference in their entirety. Alternatively or in combination, the additively manufactured object can be from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

III. Dental Appliances and Associated Methods

Figure 10A:
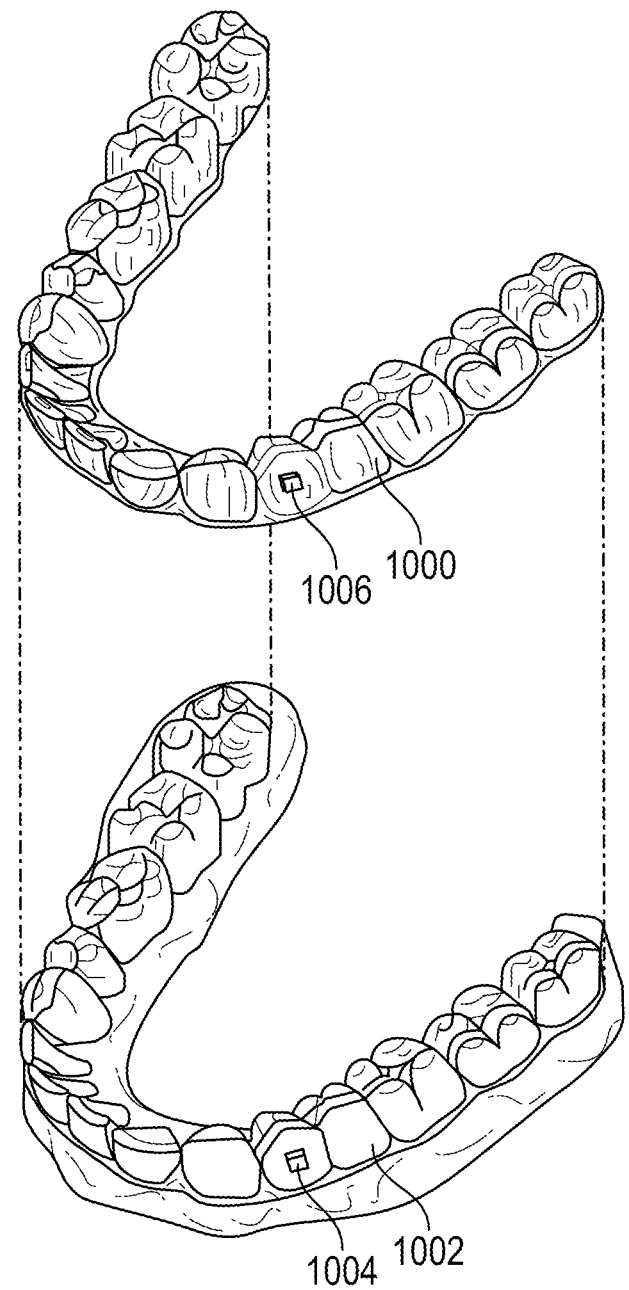
FIG. 10A illustrates a representative example of a tooth repositioning appliance configured in accordance with embodiments of the present technology.

FIG. 10A illustrates a representative example of a tooth repositioning appliance 1000 configured in accordance with embodiments of the present technology. The appliance 1000 can be manufactured using any of the systems, methods, and devices described herein. The appliance 1000 (also referred to herein as an "aligner") can be worn by a patient in order to achieve an incremental repositioning of individual teeth 1002 in the jaw. The appliance 1000 can include a shell (e.g., a continuous polymeric shell or a segmented shell) having teeth-receiving cavities that receive and resiliently reposition the teeth. The appliance 1000 or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance.

The appliance 1000 can fit over all teeth present in an upper or lower jaw, or less than all of the teeth. The appliance 1000 can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance 1000 can be a generic appliance configured to receive the teeth, but not necessarily shaped to match the topography of the patient's teeth. In some cases, only certain teeth received by the appliance 1000 are repositioned by the appliance 1000 while other teeth can provide a base or anchor region for holding the appliance 1000 in place as it applies force against the tooth or teeth targeted for repositioning. In some cases, some, most, or even all of the teeth can be repositioned at some point during treatment. Teeth that are moved can also serve as a base or anchor for holding the appliance as it is worn by the patient. In preferred embodiments, no wires or other means are provided for holding the appliance 1000 in place over the teeth. In some cases, however, it may be desirable or necessary to provide individual attachments 1004 or other anchoring elements on teeth 1002 with corresponding receptacles 1006 or apertures in the appliance 1000 so that the appliance 1000 can apply a selected force on the tooth. Representative examples of appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 10B:
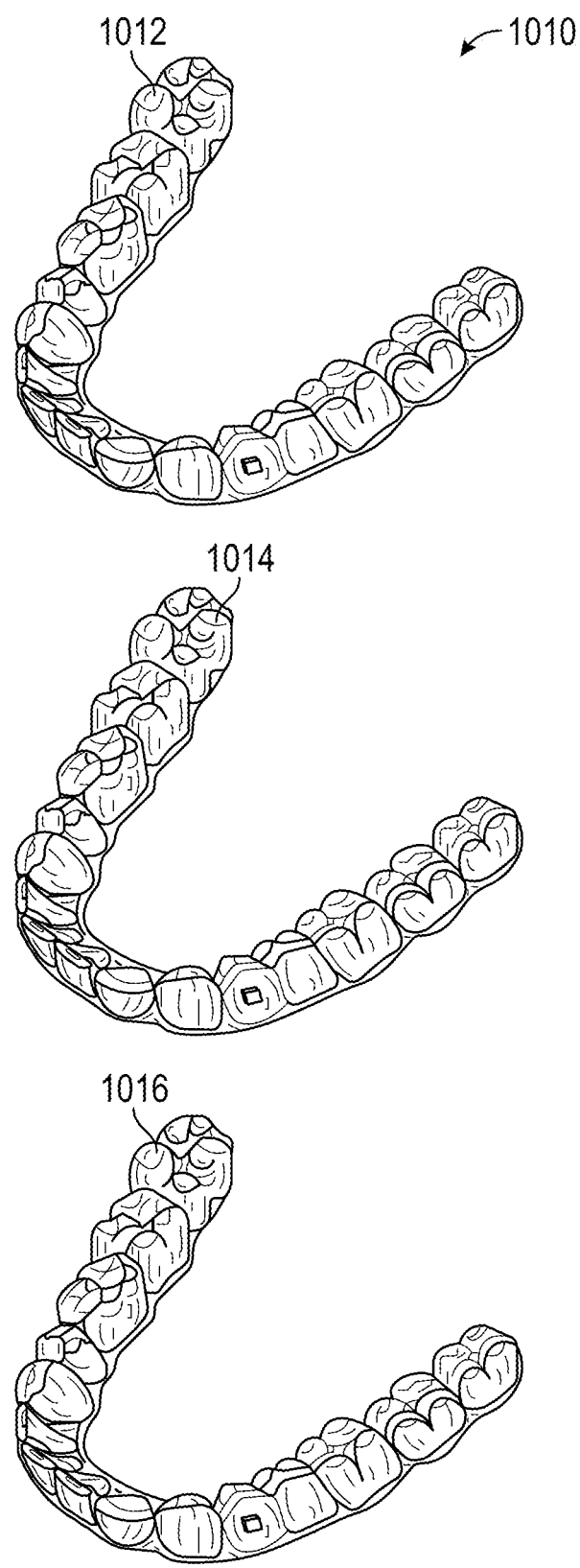
FIG. 10B illustrates a tooth repositioning system including a plurality of appliances, in accordance with embodiments of the present technology.

FIG. 10B illustrates a tooth repositioning system 1010 including a plurality of appliances 1012, 1014, 1016, in accordance with embodiments of the present technology. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 1010 can include a first appliance 1012 corresponding to an initial tooth arrangement, one or more intermediate appliances 1014 corresponding to one or more intermediate arrangements, and a final appliance 1016 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 10C:
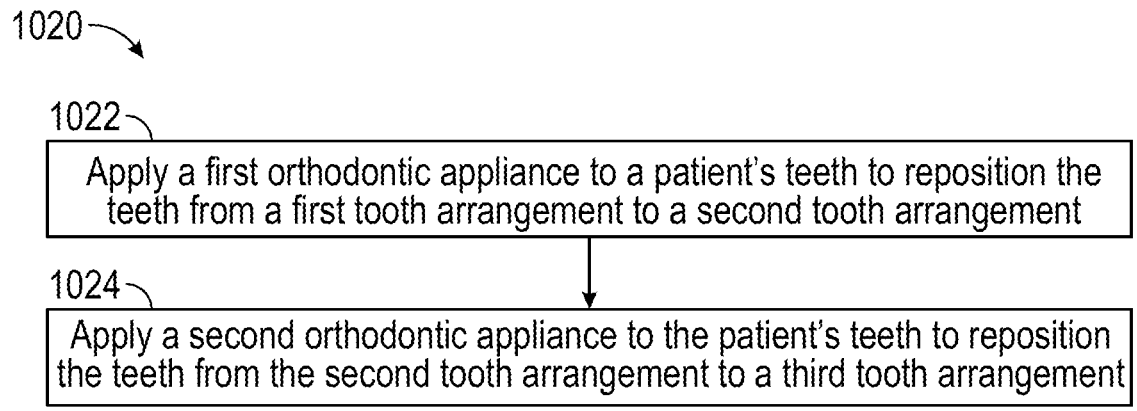
FIG. 10C illustrates a method of orthodontic treatment using a plurality of appliances, in accordance with embodiments of the present technology.

FIG. 10C illustrates a method 1020 of orthodontic treatment using a plurality of appliances, in accordance with embodiments of the present technology. The method 1020 can be practiced using any of the appliances or appliance sets described herein. In block 1022, a first orthodontic appliance is applied to a patient's teeth in order to reposition the teeth from a first tooth arrangement to a second tooth arrangement. In block 1024, a second orthodontic appliance is applied to the patient's teeth in order to reposition the teeth from the second tooth arrangement to a third tooth arrangement. The method 1020 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 11:
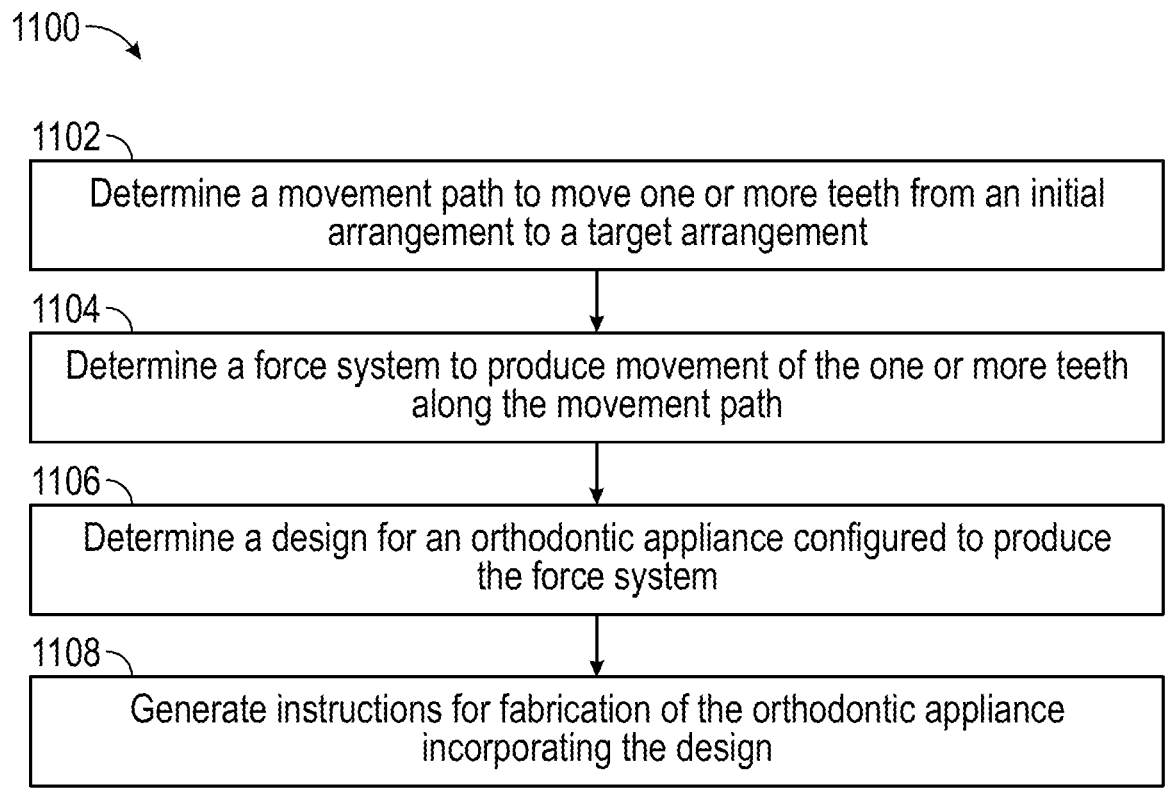
FIG. 11 illustrates a method for designing an orthodontic appliance, in accordance with embodiments of the present technology.

FIG. 11 illustrates a method 1100 for designing an orthodontic appliance, in accordance with embodiments of the present technology. The method 1100 can be applied to any embodiment of the orthodontic appliances described herein. Some or all of the steps of the method 1100 can be performed by any suitable data processing system or device, e.g., one or more processors configured with suitable instructions.

In block 1102, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 1104, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces.

These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients can require lower forces to expand the suture than older patients, as the suture has not yet fully formed.

In block 1106, a design for an orthodontic appliance configured to produce the force system is determined. The design can include the appliance geometry, material composition and/or material properties, and can be determined in various ways, such as using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA.

Optionally, one or more arch or palate expander designs can be selected for testing or force modeling. As noted above, a desired tooth movement, as well as a force system required or desired for eliciting the desired tooth movement, can be identified. Using the simulation environment, a candidate design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 1108, instructions for fabrication of the orthodontic appliance incorporating the design are generated. The instructions can be configured to control a fabrication system or device in order to produce the orthodontic appliance with the specified design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 1100 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 1100 may be performed with any suitable fabrication system or device, such as the embodiments described herein. Some of the steps may be optional, and the order of the steps can be varied as desired.

Figure 12:
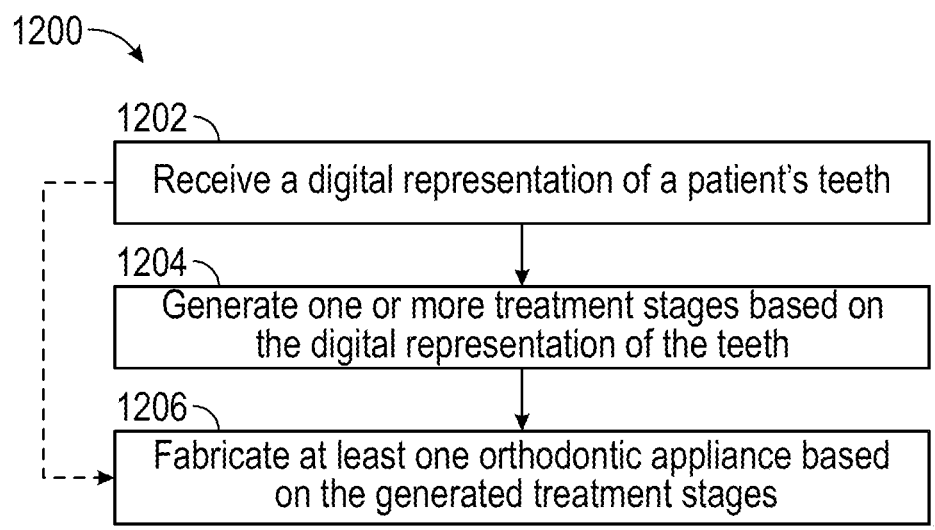
FIG. 12 illustrates a method for digitally planning an orthodontic treatment and/or design or fabrication of an appliance, in accordance with embodiments of the present technology.

FIG. 12 illustrates a method 1200 for digitally planning an orthodontic treatment and/or design or fabrication of an appliance, in accordance with embodiments. The method 1200 can be applied to any of the treatment procedures described herein and can be performed by any suitable data processing system.

In block 1202 a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 1204, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 1206, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 12, design and/or fabrication of an orthodontic appliance, and perhaps a particular orthodontic treatment, may include use of a representation of the patient's teeth (e.g., including receiving a digital representation of the patient's teeth (block 1202)), followed by design and/or fabrication of an orthodontic appliance based on a representation of the patient's teeth in the arrangement represented by the received representation.

As noted herein, the techniques described herein can be used for the direct fabrication of dental appliances, such as aligners and/or a series of aligners with tooth-receiving cavities configured to move a person's teeth from an initial arrangement toward a target arrangement in accordance with a treatment plan. Aligners can include mandibular repositioning elements, such as those described in U.S. Pat. No. 10,912,629, entitled "Dental Appliances with Repositioning Jaw Elements," filed Nov. 30, 2015; U.S. Pat. No. 10,537, 406, entitled "Dental Appliances with Repositioning Jaw Elements," filed Sep. 19, 2014; and U.S. Pat. No. 9,844,424, entitled "Dental Appliances with Repositioning Jaw Elements," filed Feb. 21, 2014; all of which are incorporated by reference herein in their entirety.

The techniques used herein can also be used to manufacture attachment fabrication templates, e.g., appliances used to position pre-fabricated attachments on a person's teeth in accordance with one or more aspects of a treatment plan. Examples of attachment fabrication templates can be found at least in: U.S. application Ser. No. 17/249,218, entitled, "Flexible 3D Printed Orthodontic Device," filed Feb. 24, 2021; U.S. application Ser. No. 16/366,686, entitled, "Dental Attachment Placement Structure," filed Mar. 27, 2019; U.S. application Ser. No. 15/674,662, entitled, "Devices and Systems for Creation of Attachments," filed Aug. 11, 2017; U.S. Pat. No. 11,103,330, entitled, "Dental Attachment Placement Structure," filed Jun. 14, 2017; U.S. application Ser. No. 14/963,527, entitled, "Dental Attachment Placement Structure," filed Dec. 9, 2015; U.S. application Ser. No. 14/939,246, entitled, "Dental Attachment Placement Structure," filed Nov. 12, 2015; U.S. application Ser. No. 14/939,252, entitled, "Dental Attachment Formation Structures," filed Nov. 12, 2015; and U.S. Pat. No. 9,1000,385, entitled, "Attachment Structure," filed Aug. 22, 2014; all of which are incorporated by reference herein in their entirety.

The techniques described herein can be used to make incremental palatal expanders and/or a series of incremental palatal expanders used to expand a person's palate from an initial position toward a target position in accordance with one or more aspects of a treatment plan. Examples of incremental palatal expanders can be found at least in: U.S. application Ser. No. 16/380,801, entitled, "Releasable Palatal Expanders," filed Apr. 10, 2019; U.S. application Ser. No. 16/22,552, entitled, "Devices, Systems, and Methods for Dental Arch Expansion," filed Jun. 28, 2018; U.S. Pat. No. 11,45,283, entitled, "Palatal Expander with Skeletal Anchorage Devices," filed Jun. 8, 2018; U.S. application Ser. No. 15/831,159, entitled "Palatal Expanders and Methods of Expanding a Palate," filed Dec. 4, 2017; U.S. Pat. No. 10,993,783, entitled, "Methods and Apparatuses for Customizing a Rapid Palatal Expander," filed Dec. 4, 2017; and U.S. Pat. No. 7,192,273, entitled, "System and Method for Palatal Expansion," filed Aug. 7, 2003; all of which are incorporated by reference herein in their entirety.

Examples

The following examples are included to further describe some aspects of the present technology, and should not be used to limit the scope of the technology.

1. A method for fabricating a dental appliance, the method comprising:

applying energy to a curable material to form a cured material layer on a build platform or on an object on the build platform, wherein the object is a portion of a dental appliance;

conveying remaining material away from the build platform;

detecting, via one or more sensors, that the remaining material includes a portion of the cured material layer that has separated from the build platform or from the object; and determining an adjustment to the energy to improve adhesion of cured material to the build platform or to the object.

2. The method of Example 1, wherein the adjustment to the energy is configured to increase a cure depth of the cured material.

3. The method of Example 1 or Example 2, wherein the adjustment comprises one or more of the following: an increased exposure time, an increased power density, or an increased energy density.

4. The method of any one of Examples 1 to 3, further comprising applying the energy with the adjustment to the curable material to form a subsequent cured material layer on the build platform or on the object.

5. The method of any one of Examples 1 to 4, wherein the curable material comprises a polymeric resin.

6. The method of any one of Examples 1 to 5, wherein the remaining material is conveyed away from the build platform by a carrier film.

7. The method of any one of Examples 1 to 6, wherein the one or more sensors comprise a force sensor.

8. The method of Example 7, further comprising measuring, via the force sensor, an amount of force applied on a blade by the remaining material conveyed away from the build platform.

9. The method of any one of Examples 1 to 8, wherein the one or more sensors comprise an imaging device.

10. The method of Example 9, further comprising:

generating, via the imaging device, image data of the remaining material conveyed away from the build platform, and analyzing the image data to detect the portion of the cured material layer that has separated from the build platform or from the object.

11. The method of any one of Examples 1 to 10, wherein the dental appliance is an aligner comprising a plurality of teeth-receiving cavities.

12. The method of Example 11, wherein the aligner is part of a series of aligners configured to reposition a patient's teeth according to an orthodontic treatment plan.

13. A method comprising:

applying energy to a curable material according to a set of print parameters to form a cured material layer on a build platform or on an object on the build platform;

conveying remaining material away from the build platform;

detecting, via one or more sensors, that the remaining material includes a portion of the cured material layer that has separated from the build platform or from the object; and determining an adjusted set of print parameters configured to improve adhesion of cured material to the build platform or to the object.

14. The method of Example 13, wherein the curable material comprises a polymeric resin.

15. The method of Example 13 or 14, wherein the remaining material is conveyed away from the build platform by a carrier film.

16. The method of Example 15, further comprising conveying the curable material toward the build platform by the carrier film.

17. The method of Example 15 or 16, wherein the carrier film is configured to move in a loop trajectory past the build platform.

18. The method of any one of Examples 13 to 17, wherein the energy comprises light energy.

19. The method of any one of Examples 13 to 18, wherein the energy comprises heat energy.

20. The method of any one of Examples 13 to 19, wherein the portion of the cured material layer comprises the entirety of the cured material layer.

21. The method of any one of Examples 13 to 20, wherein the one or more sensors comprise a force sensor.

22. The method of Example 21, further comprising measuring, via the force sensor, an amount of force applied on a blade by the remaining material conveyed away from the build platform.

23. The method of any one of Examples 13 to 22, wherein the one or more sensors comprise an imaging device.

24. The method of Example 23, further comprising:
generating, via the imaging device, image data of the remaining material conveyed away from the build platform, and
analyzing the image data to detect the portion of the cured material layer that has separated from the build platform or from the object.

25. The method of any one of Examples 13 to 24, wherein the one or more sensors comprise an optical sensor, and wherein the method further comprises measuring, via, the optical sensor, an optical property of the remaining material conveyed away from the build platform.

26. The method of any one of Examples 13 to 25, wherein the one or more sensors comprise a distance sensor, and wherein the method further comprises measuring, via the distance sensor, a height of the remaining material conveyed away from the build platform.

27. The method of any one of Examples 13 to 26, wherein the set of print parameters comprises one or more of the following: an exposure time, a power density, an energy density, or a material temperature.

28. The method of Example 27, wherein the adjusted set of print parameters comprises one or more of the following: an increased exposure time, an increased power density, an increased energy density, or an increased material temperature.

29. The method of any one of Examples 13 to 28, wherein the adjusted set of print parameters is configured to increase a cure depth of the cured material.

30. The method of any one of Examples 13 to 29, further comprising applying the energy to the curable material according to the adjusted set of print parameters to form a subsequent cured material layer on the build platform or on the object.

31. The method of any one of Examples 13 to 30, further comprising removing the portion of the cured material layer from the remaining material.

32. The method of Example 31, wherein the removing comprises contacting the remaining material with one or more blades.

33. The method of Example 32, wherein the one or more blades comprise a fixed blade.

34. The method of Example 32 or 33, wherein the one or more blades comprise an adjustable blade.

35. The method of any one of Examples 31 to 34, wherein the removing comprises filtering the remaining material.

36. The method of any one of Examples 31 to 35, further comprising directing the portion of the cured material layer into a waste container.

37. The method of any one of Examples 31 to 36, further comprising reusing the remaining material to form a subsequent cured material layer on the build platform or on the object.

38. The method of any one of Examples 13 to 37, further comprising determining a temperature of the curable material using an indirect measurement technique.

39. The method of Example 38, wherein the indirect measurement technique comprises:
measuring a viscosity of the curable material, and
determining the temperature of the curable material based on the viscosity.

40. A system for producing an additively manufactured object, the system comprising:
a printer assembly configured to form an object on a build platform from a curable material using an additive manufacturing process;
at least one sensor configured to monitor remaining material conveyed away from the build platform;
one or more processors; and
a memory operably coupled to the one or more processors and storing instructions that, when executed by the one or more processors, cause the system to perform operations comprising:
applying energy, via the printer assembly, to the curable material according to a set of print parameters to form a cured material layer on the build platform or on the object;
detecting, via the at least one sensor, that the remaining material includes a portion of the cured material layer that has separated from the build platform or from the object; and
determining an adjusted set of print parameters configured to improve adhesion of cured material to the build platform or to the object.

41. The system of Example 40, wherein the curable material comprises a polymeric resin.

42. The system of Example 40 or 41, wherein the additive manufacturing process comprises a stereolithography process.

43. The system of any one of Examples 40 to 42, wherein the printer assembly comprises a carrier film configured to convey the curable material toward the build platform and convey the remaining material away from the build platform.

44. The system of Example 43, wherein the carrier film is configured to move in a loop trajectory past the build platform.

45. The system of any one of Examples 40 to 44, wherein the printer assembly comprises a light source configured to output light toward the curable material.

46. The system of any one of Examples 40 to 45, wherein the printer assembly comprises a heat source configured to heat the curable material.

47. The system of any one of Examples 40 to 46, further comprising a blade configured to contact the remaining material conveyed away from the build platform.

48. The system of Example 47, wherein the at least one sensor comprises a force sensor configured to measure a force against the blade.

49. The system of Example 47 or 48, wherein the blade is a fixed blade.

50. The system of Example 47 or 48, wherein the blade is an adjustable blade.

51. The system of any one of Examples 47 to 50, wherein the blade is configured to remove the portion of the cured material layer from a carrier film.

52. The system of any one of Examples 40 to 51, wherein the at least one sensor comprises an imaging device configured to generate image data of the remaining material conveyed away from the build platform.

53. The system of any one of Examples 40 to 52, wherein the at least one sensor comprises an optical sensor configured to measure an optical property of the remaining material conveyed away from the build platform.

54. The system of any one of Examples 40 to 53, wherein the at least one sensor comprises a distance sensor configured to measure a height of the remaining material conveyed away from the build platform.

55. The system of any one of Examples 40 to 54, wherein the set of print parameters comprises one or more of the following: an exposure time, a power density, an energy density, or a material temperature.

56. The system of Example 55, wherein the adjusted set of print parameters comprises one or more of the following: an increased exposure time, an increased power density, an increased energy density, or an increased material temperature.

57. The system of any one of Examples 40 to 56, wherein the adjusted set of print parameters is configured to increase a cure depth of the cured material.

58. The system of any one of Examples 40 to 57, wherein the operations further comprise applying the energy to the curable material according to the adjusted set of print parameters to form a subsequent cured material layer on the build platform.

59. The system of any one of Examples 40 to 58, further comprising a waste management assembly configured to process the remaining material for reuse in a subsequent additive manufacturing process.

60. The system of Example 59, wherein the waste management assembly comprises a filtration unit configured to filter the remaining material.

61. The system of Example 59 or 60, wherein the waste management assembly comprises a container for collecting the portion of the cured material layer.

62. The system of any one of Examples 40 to 61, further comprising an agitator configured to apply vibrations to the curable material, wherein the operations further comprise determining a temperature of the curable material based on a response of the curable material to the vibrations.

63. The system of any one of Examples 40 to 62, further comprising a flow restrictor positioned in contact with the curable material, wherein the operations further comprise determining a temperature of the curable material based on a height differential of the curable material at the flow restrictor.

64. A non-transitory computer-readable storage medium comprising instructions that, when executed by one or more processors of a computing system, cause the computing system to perform operations comprising:
applying energy to a precursor material according to a set of print parameters to form a solidified material layer on a build platform or on an object on the build platform;
detecting, via one or more sensors, that remaining material conveyed away from the build platform includes a portion of the solidified material layer that has separated from the build platform or from the object;
determining a modified set of print parameters configured to improve adhesion of solidified material to the build platform or to the object; and
applying the energy to the precursor material according to the modified set of print parameters to form a subsequent solidified material layer on the build platform or on the object.

65. A method for additive manufacturing of a dental appliance, the method comprising:
determining a viscosity of a curable material conveyed on a carrier film of a printer assembly;
determining a temperature of the curable material, based on the viscosity;
adjusting heating of the curable material by one or more heat sources, based on the temperature; and
applying energy to the heated curable material to form a portion of the dental appliance.

66. The method of Example 65, wherein determining the viscosity of the curable material comprises:
applying vibrations to the curable material using an agitator,
measuring a response of the curable material to the vibrations, and
determining the viscosity of the curable material based on the response.

67. The method of Example 66, wherein the agitator is coupled to the carrier film.

68. The method of Example 66 or 67, wherein the agitator comprises a piezoelectric transducer or an ultrasonic transducer.

69. The method of any one of Examples 65 to 68, wherein determining the viscosity of the curable material comprises:
positioning a flow restrictor in contact with the curable material,
measuring a first height of the curable material upstream of the flow restrictor,
measuring a second height of the curable material downstream of the flow restrictor, and
determining the viscosity based on the first and second heights.

70. The method of Example 69, wherein the flow restrictor comprises a blade.

71. The method of any one of Examples 65 to 70, wherein the temperature of the curable material is determined at a first location of the printer assembly, and the energy is applied to the curable material at a second location different from the first location.

72. The method of Example 71, further comprising estimating a second temperature of the curable material at the second location.

73. The method of any one of Examples 65 to 72, wherein the curable material comprises a polymeric resin.

74. The method of any one of Examples 65 to 73, wherein the energy comprises one or more of light energy or heat energy.

75. The method of any one of Examples 65 to 74, wherein the dental appliance is an aligner comprising a plurality of teeth-receiving cavities.

76. The method of Example 75, wherein the aligner is part of a series of aligners configured to reposition a patient's teeth according to an orthodontic treatment plan.

77. A method comprising:
determining a viscosity of a curable material to be used to form an additively manufactured object;

determining a temperature of the curable material, based on the viscosity;

adjusting one or more heat sources configured to heat the curable material, based on the temperature; and applying energy to the curable material to form a portion of the additively manufactured object, after adjusting the one or more heat sources.

78. The method of Example 77, wherein the curable material comprises a polymeric resin.

79. The method of Example 77 or 78, wherein determining the viscosity of the curable material comprises:

applying vibrations to the curable material using an agitator, measuring a response of the curable material to the vibrations, and determining the viscosity of the curable material based on the response.

80. The method of Example 79, wherein the agitator is coupled to a carrier film supporting the curable material.

81. The method of Example 79 or 80, wherein the agitator comprises a piezoelectric transducer or an ultrasonic transducer.

82. The method of any one of Examples 79 to 81, wherein the agitator is positioned at a deposition zone or a pre-print zone of the printer assembly.

83. The method of any one of Examples 79 to 82, wherein the response comprises a displacement amplitude of the curable material over time.

84. The method of any one of Examples 79 to 83, wherein the response is measured using one or more of the following: a piezoelectric transducer, an ultrasonic transducer, an imaging device, a displacement sensor, a distance sensor, a force sensor, a strain sensor, or a position sensor.

85. The method of any one of Examples 77 to 84, wherein determining the viscosity of the curable material comprises:

positioning a flow restrictor in contact with the curable material, measuring a first height of the curable material upstream of the flow restrictor, measuring a second height of the curable material downstream of the flow restrictor, and determining the viscosity based on the first and second heights.

86. The method of Example 85, wherein the flow restrictor comprises a blade.

87. The method of Example 85 or 86, wherein the flow restrictor is positioned at a deposition zone or a pre-print zone of the printer assembly.

88. The method of any one of Examples 85 to 87, wherein the first and second heights are measured using one or more of the following: an imaging device, a displacement sensor, a distance sensor, a strain sensor, a force sensor, or an interferometer.

89. The method of any one of Examples 77 to 88, wherein the temperature of the curable material is determined at a first location of the printer assembly, and the energy is applied to the curable material at a second location different from the first location.

90. The method of Example 89, further comprising estimating a second temperature of the curable material at the second location.

91. The method of Example 90, wherein the second temperature is estimated based on one or more of the following: a movement speed of the curable material, an exposed surface area of the curable material, a radiant heat transfer coefficient of the curable material, or a convective heat transfer coefficient of the curable material.

92. The method of any one of Examples 89 to 91, wherein the first location comprises a deposition zone or a pre-print zone, and the second location comprises a print zone.

93. The method of any one of Examples 77 to 92, wherein adjusting the one or more heat sources comprises adjusting one or more of the following: an amount of heat produced by the one or more heat sources, a direction of the heat produced by the one or more heat sources, an amount of time the heat is applied by the one or more heat sources, or a number of the one or more heat sources that are active.

94. The method of any one of Examples 77 to 93, wherein the energy comprises one or more of light energy or heat energy.

95. The method of any one of Examples 77 to 94, wherein the portion of the additively manufactured object is formed on a build platform, and the method further comprises:

conveying remaining material away from the build platform, detecting that the remaining material includes one or more cured elements, and determining an adjusted set of print parameters configured to improve adhesion of cured material to the build platform or to the additively manufactured object.

96. The method of Example 95, wherein the adjusted set of print parameters comprises one or more of the following: an increased exposure time, an increased power density, an increased energy density, or an increased material temperature.

97. A system for producing an additively manufactured object, the system comprising:

a printer assembly configured to form an object on a build platform from a curable material using an additive manufacturing process;

one or more heat sources configured to heat the curable material;

a processor; and a memory operably coupled to the processor and storing instructions that, when executed by the processor, cause the system to perform operations comprising:

determining a viscosity of the curable material;

determining a temperature of the curable material, based on the viscosity;

adjusting the one or more heat sources, based on the temperature; and applying energy to the curable material via the printer assembly to form a portion of the object.

98. The system of Example 97, wherein the curable material comprises a polymeric resin.

99. The system of Example 97 or 98, further comprising an agitator configured to apply vibrations to the curable material, wherein the viscosity of the curable material is determined based on a response of the curable material to the vibrations.

100. The system of Example 99, wherein the printer assembly comprises a carrier film configured to transport the curable material, and wherein the agitator is coupled to the carrier film.

101. The system of Example 99 or 100, wherein the agitator comprises a piezoelectric transducer or an ultrasonic transducer.

102. The system of any one of Examples 99 to 101, wherein the agitator is positioned at a deposition zone or a pre-print zone of the printer assembly.

103. The system of any one of Examples 99 to 102, wherein the response comprises a displacement amplitude of the curable material over time.

104. The system of any one of Examples 99 to 103, further comprising a sensor configured to measure the response of the curable material to the vibrations.

105. The system of Example 104, wherein the sensor comprises one or more of the following: a piezoelectric transducer, an ultrasonic transducer, an imaging device, a displacement sensor, a distance sensor, a force sensor, a strain sensor, or a position sensor.

106. The system of any one of Examples 97 to 105, further comprising a flow restrictor configured to partially block flow of the curable material, wherein the viscosity of the curable material is determined based on a height differential of the curable material at or near the flow restrictor.

107. The system of Example 106, wherein the flow restrictor comprises a blade.

108. The system of Example 106 or 107, wherein the flow restrictor is positioned at a deposition zone or a pre-print zone of the printer assembly.

109. The system of any one of Examples 106 to 108, further comprising a sensor configured to measure the height differential.

110. The system of Example 109, wherein the sensor comprises one or more of the following: an imaging device, a displacement sensor, a distance sensor, a strain sensor, a force sensor, or an interferometer.

111. The system of any one of Examples 97 to 110, wherein the temperature of the curable material is determined at a first location of the printer assembly, and the energy is applied to the curable material at a second location different from the first location.

112. The system of Example 111, wherein the operations further comprise estimating a second temperature of the curable material at the second location.

113. The system of Example 112, wherein the second temperature is estimated based on one or more of the following: a movement speed of the curable material, an exposed surface area of the curable material, a radiant heat transfer coefficient of the curable material, or a convective heat transfer coefficient of the curable material.

114. The system of any one of Examples 111 to 113, wherein the first location comprises a deposition zone or a pre-print zone, and the second location comprises a print zone.

115. The system of any one of Examples 97 to 114, wherein adjusting the one or more heat sources comprises adjusting one or more of the following: an amount of heat produced by the one or more heat sources, a direction of the heat produced by the one or more heat sources, an amount of time the heat is applied by the one or more heat sources, or a number of the one or more heat sources that are active.

116. The system of any one of Examples 97 to 115, further comprising at least one sensor configured to monitor remaining material conveyed away from the build platform, wherein the operations further comprise:
  detecting that the remaining material includes one or more cured elements, and
  determining an adjusted set of print parameters configured to improve adhesion of cured material to the build platform or to the object.

117. The system of Example 116, wherein the adjusted set of print parameters comprises one or more of the following: an increased exposure time, an increased power density, an increased energy density, or an increased material temperature.

118. A non-transitory computer-readable storage medium comprising instructions that, when executed by one or more processors of a computing system, cause the computing system to perform operations comprising:
  determining a viscosity of a precursor material for forming an additively manufactured object;
  determining a temperature of the precursor material, based on the viscosity;
  adjusting an operational parameter of the printer assembly, based on the temperature; and
  applying energy to the precursor material to form a portion of the additively manufactured object.

CONCLUSION

Although many of the embodiments are described above with respect to systems, devices, and methods for manufacturing orthodontic appliances, the technology is applicable to other applications and/or other approaches, such as manufacturing of other types of objects. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1A-12.

The various processes described herein can be partially or fully implemented using program code including instructions executable by one or more processors of a computing system for implementing specific logical functions or steps in the process. The program code can be stored on any type of computer-readable medium, such as a storage device including a disk or hard drive. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

To the extent any materials incorporated herein by reference conflict with the present disclosure, the present disclosure controls.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method for fabricating a dental appliance, the method comprising:
    applying energy to a curable material to form a cured material layer on a build platform or on an object on the build platform, wherein the object is a portion of a dental appliance;
    conveying remaining curable material away from the build platform;
    detecting, via one or more sensors, that the remaining curable material includes a portion of the cured material layer that has separated from the build platform or from the object; and
    determining an adjustment to the energy to improve adhesion of cured material to the build platform or to the object.

2. The method of claim 1, wherein the adjustment to the energy is configured to increase a cure depth of the cured material.

3. The method of claim 1, wherein the adjustment comprises one or more of the following: an increased exposure time, an increased power density, or an increased energy density.

4. The method of claim 1, further comprising applying the energy with the adjustment to the curable material to form a subsequent cured material layer on the build platform or on the object.

5. The method of claim 1, wherein the curable material comprises a polymeric resin.

6. The method of claim 1, wherein the remaining curable material is conveyed away from the build platform by a carrier film.

7. The method of claim 1, wherein the one or more sensors comprise a force sensor.

8. The method of claim 7, further comprising measuring, via the force sensor, an amount of force applied on a blade by the remaining curable material conveyed away from the build platform.

9. The method of claim 1, wherein the one or more sensors comprise an imaging device.

10. The method of claim 9, further comprising:
    generating, via the imaging device, image data of the remaining curable material conveyed away from the build platform, and
    analyzing the image data to detect the portion of the cured material layer that has separated from the build platform or from the object.

11. The method of claim 1, wherein the dental appliance is an aligner comprising a plurality of teeth-receiving cavities.

12. The method of claim 11, wherein the aligner is part of a series of aligners configured to reposition a patient's teeth according to an orthodontic treatment plan.

13. A method for fabricating an object comprising:
    applying energy to a curable material according to a set of print parameters to form a cured material layer on a build platform or on an object on the build platform;
    conveying remaining curable material away from the build platform;
    detecting that a portion of the cured material layer has been conveyed away from the build platform along with the remaining curable material; and
    adjusting the set of print parameters to improve adhesion of cured material to the build platform or to the object.

14. The method of claim 13, wherein the energy comprises one or more of light energy or heat energy.

15. The method of claim 13, wherein the detection is performed using a force sensor.

16. The method of claim 15, further comprising measuring, via the force sensor, an amount of force applied on a blade by the remaining curable material conveyed away from the build platform.

17. The method of claim 13, wherein the detection is performed using an imaging device.

18. The method of claim 17, further comprising:
    generating, via the imaging device, image data of the remaining curable material conveyed away from the build platform, and
    analyzing the image data to detect the portion of the cured material layer that has been conveyed away from the build platform.

19. The method of claim 13 wherein adjusting the set of print parameters comprises adjusting one or more of the following: an exposure time, a power density, an energy density, or a material temperature.

20. The method of claim 13, wherein the adjustment is configured to increase a cure depth of the cured material.

* * * * *

UNITED STATES PATENT AND TRADEMARK OFFICE
CERTIFICATE OF CORRECTION

PATENT NO. : 12,319,006 B2
APPLICATION NO. : 18/173585
DATED : June 3, 2025
INVENTOR(S) : Paramjot Singh et al.

Page 1 of 1

It is certified that error appears in the above-identified patent and that said Letters Patent is hereby corrected as shown below:

In the Claims

In Column 44, in Claim 19, Line 53, delete "claim 13" and insert -- claim 13, --, therefor.

Signed and Sealed this
First Day of July, 2025

Coke Morgan Stewart
*Acting Director of the United States Patent and Trademark Office*